United States Patent [19]

Fujishima

[11] Patent Number: 5,850,338
[45] Date of Patent: Dec. 15, 1998

[54] NUMERICAL CONTROL SYSTEM USING A PERSONAL COMPUTER AND A METHOD OF CONTROLLING THE SAME

[75] Inventor: Mitsushiro Fujishima, Tokyo, Japan

[73] Assignee: Mitsubishi Denki Kabushiki Kaisha, Tokyo, Japan

[21] Appl. No.: 739,749

[22] Filed: Oct. 29, 1996

[30] Foreign Application Priority Data

Nov. 8, 1995 [JP] Japan .................................. 7-289747

[51] Int. Cl.⁶ .................................................. G05B 5/34
[52] U.S. Cl. .................................. 364/132; 395/200.39
[58] Field of Search .................................. 364/140, 136, 364/132; 195/182, 200.38–200.41; 326/93

[56] References Cited

U.S. PATENT DOCUMENTS

| | | | |
|---|---|---|---|
| 4,228,495 | 10/1980 | Bernhard et al. | 364/136 |
| 4,263,647 | 4/1981 | Merrell et al. | 364/136 |
| 4,618,953 | 10/1986 | Daniels et al. | 395/182.21 |
| 4,635,186 | 1/1987 | Oman et al. | 395/182.08 |

FOREIGN PATENT DOCUMENTS

| | | | |
|---|---|---|---|
| 60-45808 | 3/1985 | Japan | G05B 19/415 |
| 63-237105 | 10/1988 | Japan | G05B 19/403 |
| A-2152714 | 8/1985 | United Kingdom . | |
| A-2163871 | 3/1986 | United Kingdom . | |
| A-2241123 | 8/1991 | United Kingdom . | |
| 87/07054 WO-A- | 11/1987 | WIPO | G06F 9/00 |
| 9622572 | 7/1996 | WIPO . | |

*Primary Examiner*—Reba I. Elmore
*Assistant Examiner*—Sheela S. Rao
*Attorney, Agent, or Firm*—Sughrue, Mion, Zinn, Macpeak & Seas, PLLC

[57] ABSTRACT

A PLL circuit 31 of a pulse convert/output circuit 12 in an NC board A 1 receives a fundamental clock signal CLK through a PC extension bus 207 from a fundamental clock generating circuit 201, and generates a sync pulse signal PLS on the basis of the received fundamental clock signal CLK. The sync pulse signal PLS is inputted to a gate 34. A signal select circuit 33 receives an address signal AD, or a RESET signal or an IRQ signal through the PC extension bus 207, and generates a pulse-outputting permission signal N3 on the basis of the received signal. The pulse-outputting permission signal N3 controls a gate 34 which determines the timing of starting the outputting of the sync pulse signal PLS. Consequently, a sync signal PLSOUT that is synchronized with those in the remaining NC boards is generated.

18 Claims, 19 Drawing Sheets

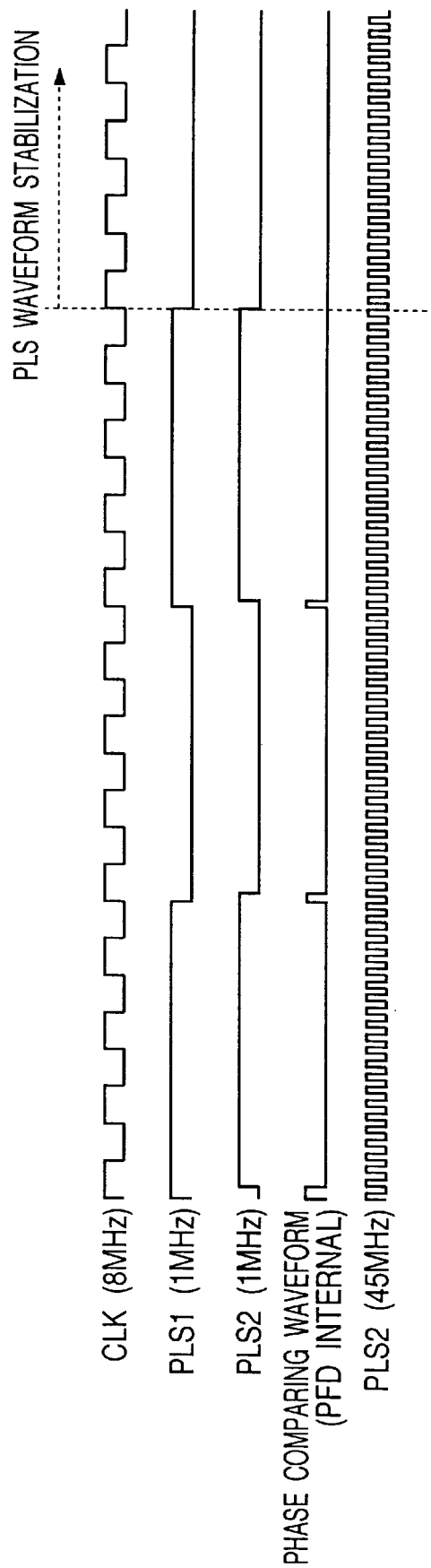

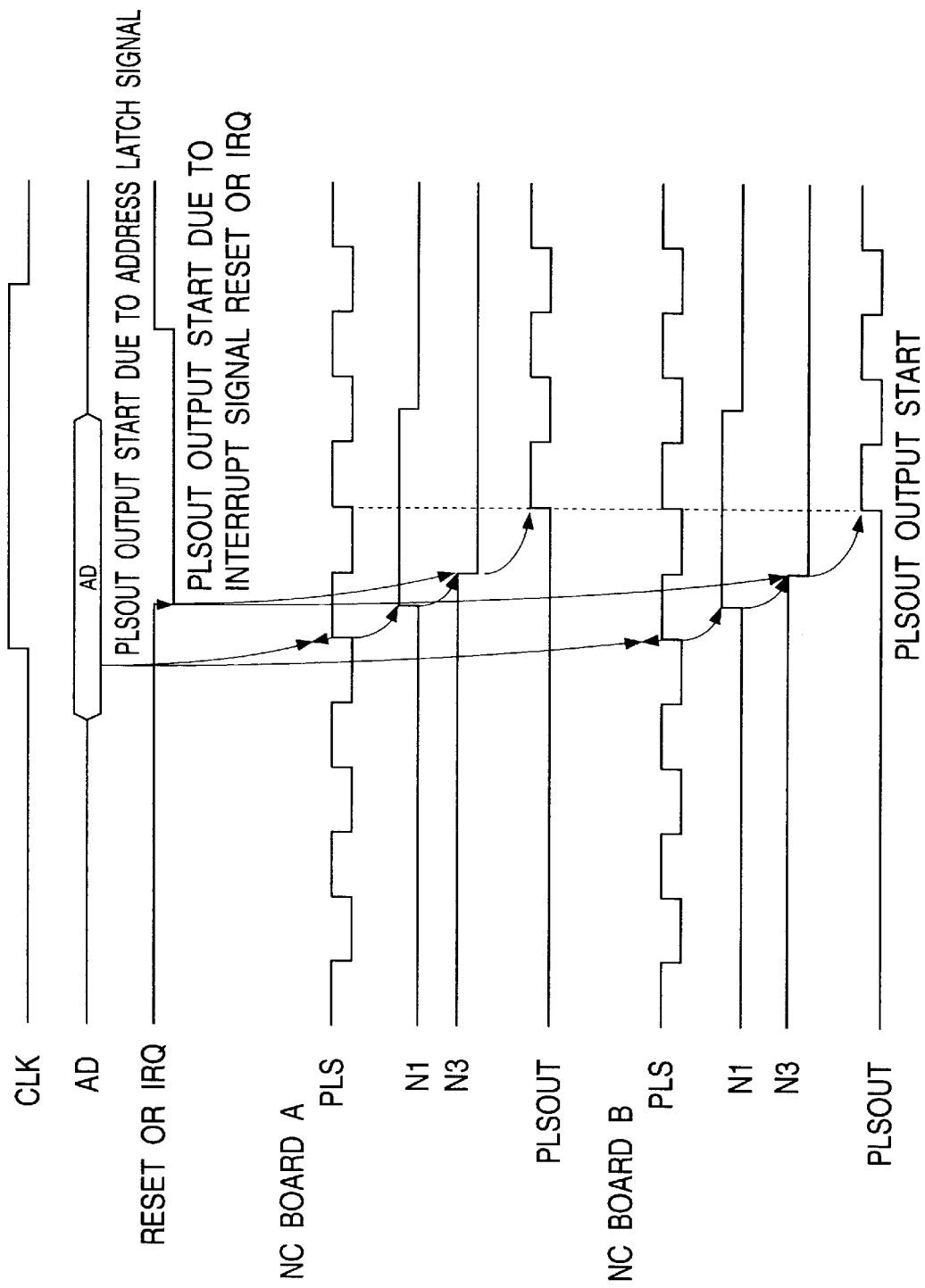

FIG. 6

INTERPOLATING PROCESS FOR X- AND Y-AXES

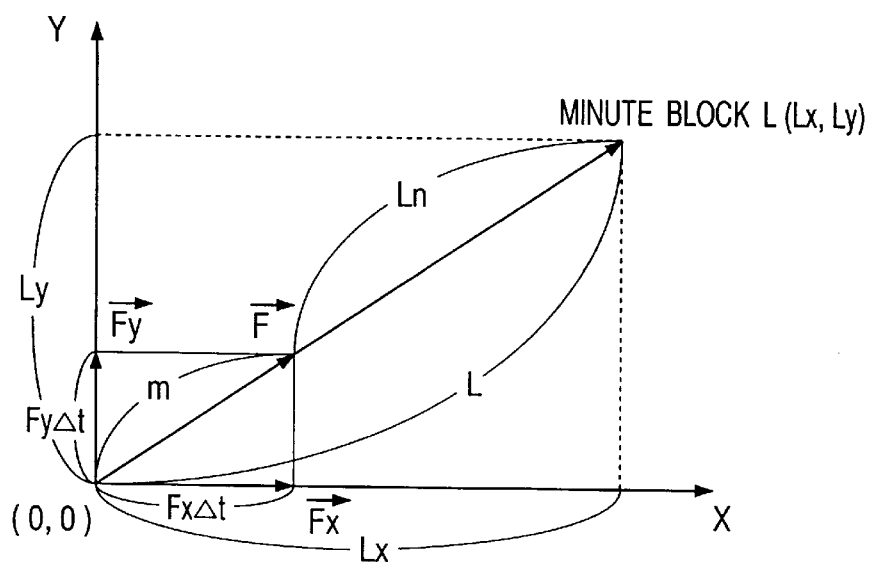

L  : MINUTE BLOCK MOVEMENT QUANTITY ($\mu$m)
Lx : X-AXIAL BLOCK MOVEMENT QUANTITY ($\mu$m)
Ly : Y-AXIAL BLOCK MOVEMENT QUANTITY ($\mu$m)
Lm : MOVEMENT QUANTITY PER MINUTE UNIT TIME
Ln : REMNANT DISTANCE OF Lm $\Delta$t : MINUTE UNIT TIME (ms)
$\vec{F}$ : DIRECTIONAL VECTOR
$\vec{Fx}$ : X-AXIAL DIRECTIONAL VECTOR
$\vec{Fy}$ : Y-AXIAL DIRECTIONAL VECTOR Fx$\Delta$t : ($\mu$m)
Fy$\Delta$t : ($\mu$m)

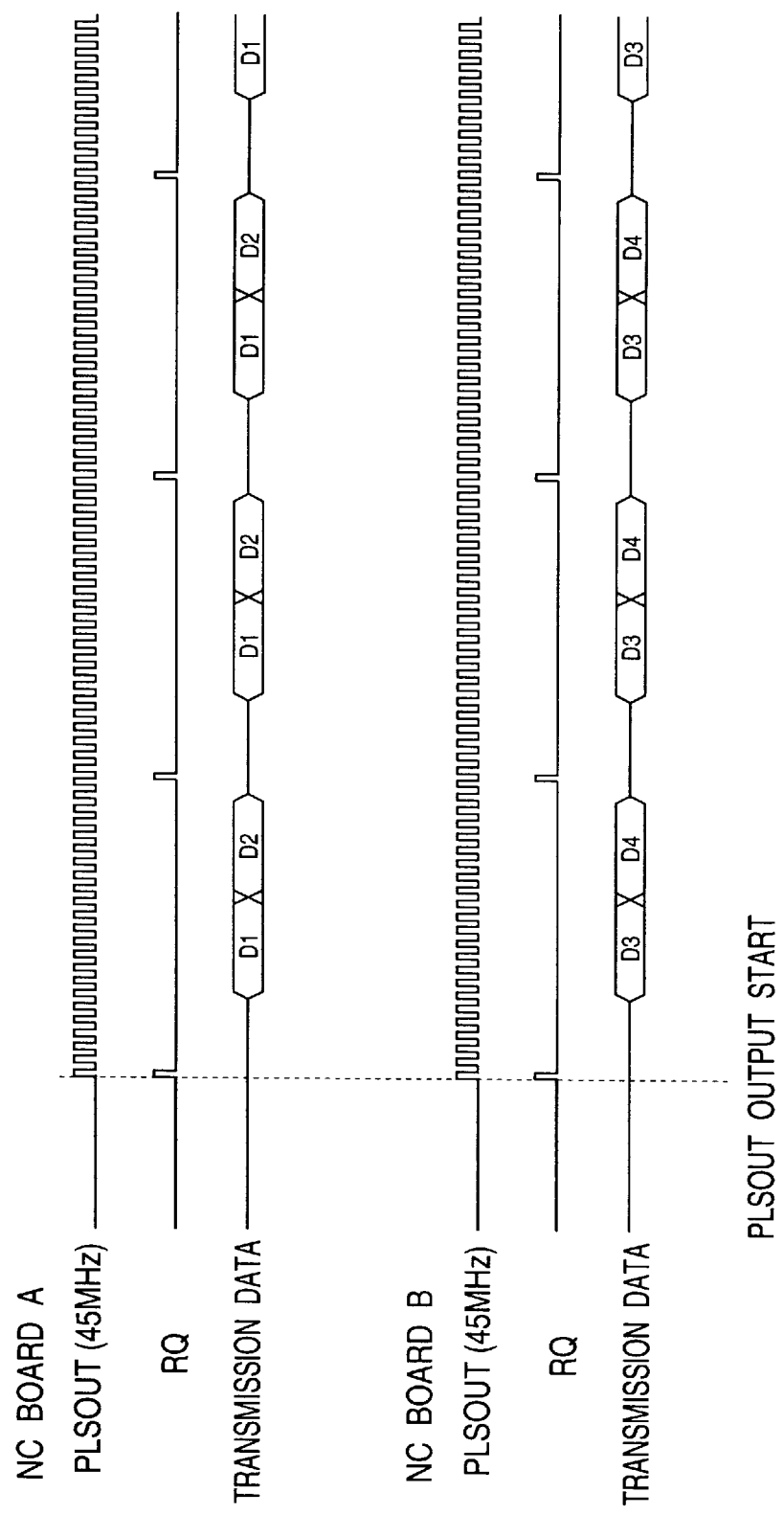

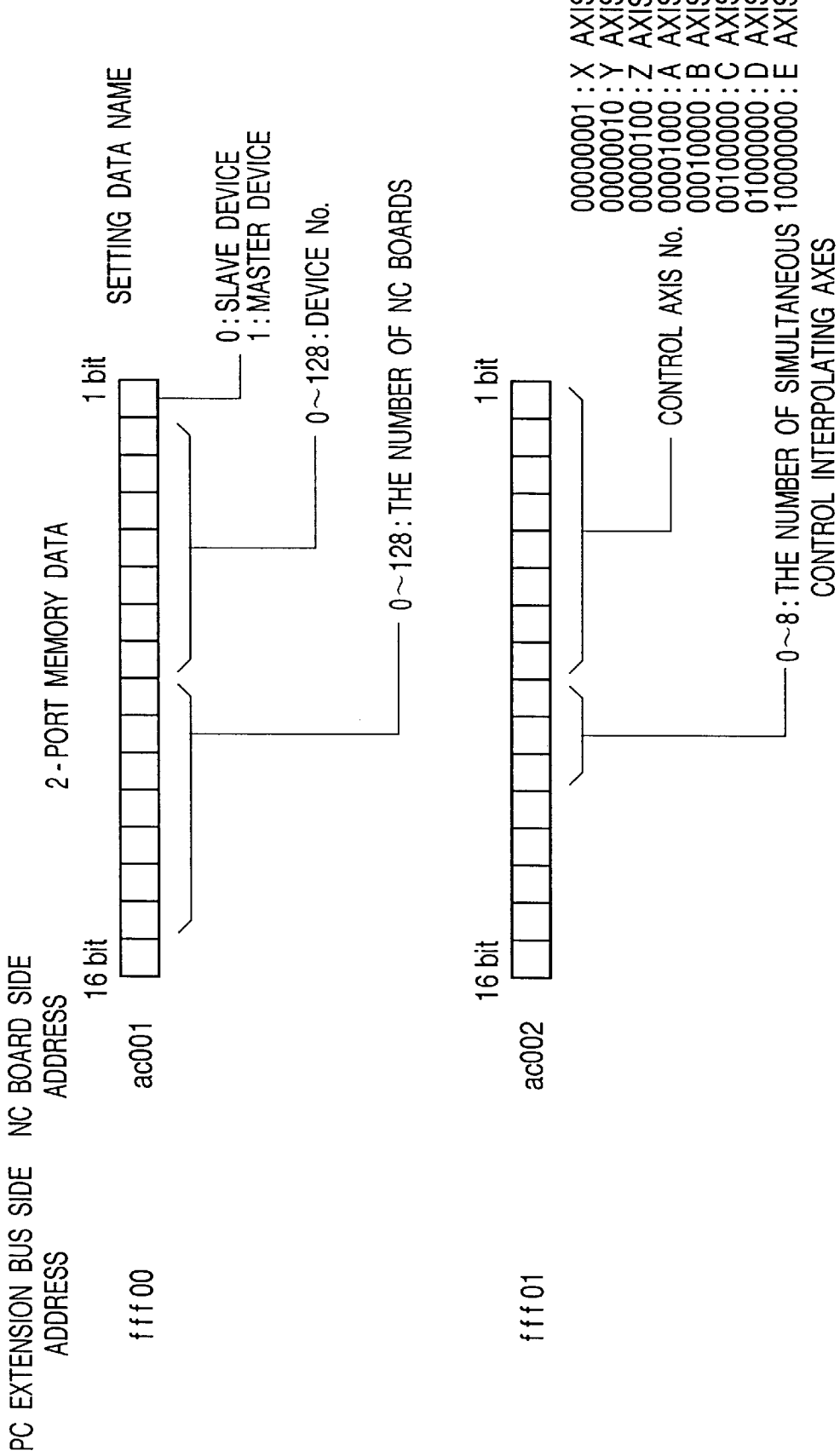

NUMERICAL CONTROL SYSTEM USING A PERSONAL COMPUTER AND A METHOD OF CONTROLLING THE SAME

BACKGROUND OF THE INVENTION

1. Field of the Invention

The present invention relates to a numeral control system (referred to as an NC system) using a personal computer (referred frequently to as a PC) and a method of controlling the NC system. More particularly, the invention relates to the improvements of a method of synchronously controlling NC boards when a plural number of control boards (referred to as NC boards) with numerical control functions are connected to an input/output extension bus (referred to as a PC extension bus) of a personal computer, and a method of controlling an alarm system.

2. Description of the Related Art

There has been known a system for synchronously operating a plural number of NC boards in which one command pulse generator is externally provided, and a command pulse generated by the pulse generator is distributed to the NC boards coupled with controlled shafts. In another system, as disclosed in Japanese Patent Unexamined publication No. Sho. 60-45808, a pulse generator is provided on an NC board as a master device. A pulse signal, generated by the pulse generator, is used as a command pulse applied to all of a plural number of NC boards, to thereby synchronize the NC boards in their operation.

With the prevalence of the personal computers, a PC-basis numerical control system is proposed. In the numerical control system, a personal computer is coupled with a plural number of NC boards, and external devices, such as servo motors and remote I/O units, are synchronously controlled.

An example of this type of the numerical control system is shown in FIG. 19. In the figure, reference numeral 100 designates a numerical control system as a PC-function extending section, which includes a plural number of NC boards 101, 102, . . . . The NC board 101 serving as a master device includes a pulse generator 103, an I/O circuit 104 that receives analysis data from a PC section 200, and an arithmetic/logic circuit 105 for carrying out an interpolation calculating process for the servo motors and a synchronous control of remote I/O units, which are included in external devices 301, 302, . . . , on the basis of the analysis data received from the I/O circuit 104. NC boards 102, . . . serving as slaves each include each an I/O circuit 104 that receives the analysis data from the PC section 200, and an arithmetic/logic circuit 105 for carrying out an interpolation calculating process for the servo motors and a synchronous control of remote I/O units, which are included in external devices 301, 302, . . . , on the basis of the analysis data received from the I/O circuit 104. These NC boards are interconnected by an external bus 107, exclusively used for these boards. The bus is formed by connecting the terminals 106 of the NC boards by means of an external cable.

A personal computer (PC) section 200 is comprised of a fundamental clock generator circuit 201, a personal computer (PC) CPU 202, a memory 203, a CPU peripheral circuit 204, an interface (I/F) circuit 205, an auxiliary memory device 206, and a personal computer (PC) extension bus 207. The I/O circuit 104 receives analysis data from the personal computer through the PC extension bus 207. A CPU (not shown) in the arithmetic/logic circuit 105 receives the analysis data and carries out an interpolation calculating process for each of the servo motors. The interpolated data is transmitted to the servo amplifiers for driving the servo motors. The arithmetic/logic circuits 105 in the external devices 301 and 302 receive a pulse signal from the pulse generator 103, through the external bus 107. As a result, the servo motors in the external devices 301 and 302 are synchronized with each other.

In the conventional PC-basis numerical control system, one pulse generator must be provided in an external place or one of the NC boards. A bus exclusively used for transmitting a pulse signal from the pulse generator to the NC boards must be used to synchronize those NC boards. The bus is formed by connecting the terminals of the NC boards by an external cable, for example. This construction restricts a system flexibility in the PC-basis NC system.

Ambient conditions, such as dust, vibration, temperature, and the like, in a place where FA (factory automation) devices are installed are worse than those in a place where OA (office automation) devices are installed. To construct a reliable PC-basis NC system, when an operating system of the personal computer, which is easily affected by bad ambient conditions, fails to operate properly, it is necessary to quickly detect this failure and to properly process the functions of the NC boards.

When an abnormality occurs in any of the NC boards, and the servo amplifiers, the motors and the like which are included in the external devices, it is necessary to send an alarm signal to the devices being synchronously controlled, and to minimize the out-out-position among the driven components. Further, it is necessary to quickly inform an operator of the faulty state.

SUMMARY OF THE INVENTION

The present invention has been made in view of the above circumstances, and therefore an object of the invention is to provide a PC-basis numerical control system that does not require such a pulse generator which is included in one of a plural number NC boards and is exclusively used for synchronizing the NC boards, and does not require a bus, formed by an external cable, for transmitting a pulse signal from the pulse generator to the NC boards, and a method of controlling the PC-basis numerical control system.

Another object of the present invention is to provide a PC-basis numerical control system operating such that when an operating system of the personal computer fails to operate properly, the numerical control system quickly detects such a failure state of the system, automatically determines whether the working process is stopped or continued, and properly controls the functions of the NC boards, and a method of controlling the PC-basis numerical control system.

Still another object of the present invention is to provide a PC-basis numerical control system operating such that when something is wrong with one or some the NC boards, and the servo amplifiers, the motors and the like which are included in the external devices, the numerical control system sends an alarm signal to the devices being synchronously controlled, and minimizes the out-out-position among the driven components, and a method of controlling the PC-basis numerical control system.

Yet another object of the present invention is provide a PC-basis numerical control system operating such that when something is wrong with one or some of the NC boards, and the servo amplifiers, the motors and the like which are included in the external devices, the numerical control system quickly informs an operator of the faulty state, and a method of controlling the PC-basis numerical control system.

According to one aspect of the present invention, there is provided a numerical control system using a personal computer, which has a personal computer including clock signal generating means and a personal computer (PC) extension bus for input/output extension, and a plural number of NC boards, connected to the PC extension bus, for controlling one of the servo amplifier system or the remote I/O unit system, wherein one of the plural number of NC boards is used as a master device and the remaining NC boards are used as slave devices, each of the slave devices comprises: sync signal generating means for receiving a pulse signal from the clock signal generating means through the PC extension bus; sync signal gate means for controlling the timing of starting the outputting operation of a pulse signal from the sync signal generating means; pulse-outputting permission signal generating means for receiving a control signal from the personal computer through the PC extension bus 207, the pulse-outputting permission signal generating means generates a pulse output permission signal on the basis of a control signal that is simultaneously received from the master device through the PC extension bus, and the sync signal gate means starts the outputting of the pulse signal received from the sync signal generating means, in response to the control signal from the master device, whereby the plurality of slave devices are synchronized with one another in their operation.

In the numerical control system, the control signal is an address signal or an interrupt signal.

According to another aspect of the present invention, there is provided a method of controlling a numerical control system using a personal computer, which has a personal computer including clock signal generating means and a personal computer (PC) extension bus for input/output extension, and a plural number of NC boards connected to the PC extension bus, for controlling one of the servo amplifier system or the remote I/O unit system, wherein one of the plural number of NC boards is used as a master device and the remaining NC boards are used as slave devices, the slave devices synchronize the pulse signals received through the PC extension bus from the clock signal generating means on the basis of control signals simultaneously received through the PC extension bus from the master device, whereby the plurality of slave devices are synchronized with one another in their operation.

In the method of controlling the numerical control system, the control signal is an address signal or an interrupt signal.

In the method of controlling the numerical control system, at the time of starting up, the personal computer outputs initial setting data to the plural number of NC boards through the PC extension bus, and places the NC boards to a master mode or a slave mode with the initial setting data.

In the method of controlling the numerical control system, the master device analyzes a work program and outputs the data resulting from the analysis of the work program to the slave device, through the PC extension bus, and the slave device processes the analysis data in a calculative manner and sends the resultant data to one of the servo amplifier system and the remote I/O unit system in synchronism with the remaining one of the slave devices.

In the method of controlling the numerical control system, when the personal computer serves as a master device, the personal computer analyzes a work program read out of a storage device contained in the personal computer per se, acquires the priority right to use the PC extension bus, and outputs the analysis data of the work program to the plural number of slave devices through the PC extension bus, when one of the NC boards is a master device, the master device acquires the priority right to use the PC extension bus from the personal computer, reads the work program from the storage device of the personal computer through the PC extension bus, analyzes the readout work program, and acquires again the priority right to use the PC extension bus from the personal computer, and sends the analysis data of the work program through the PC extension bus to the plural number of slave devices.

In the method of controlling the numerical control system, each of the NC boards as the slave devices generates a request signal recurring at predetermined periods by using a control command from the master device and a sync signal generated from the clock signal generating means, forms the data to be applied to the servo amplifiers and the remote I/O units as objects to be controlled, transmits the formed data to the servo amplifiers and the remote I/O units in synchronism with the request signal recurring at given periods, and synchronizes the request signals generated by the NC boards as the slave devices, whereby the servo amplifiers and the remote I/O units, which are controlled by the NC boards as the slave devices, are synchronously controlled.

In the method of controlling the numerical control system, each of the NC boards as the slave devices generates a request signal recurring at predetermined periods by using a control command from the master device and a sync signal generated from the clock signal generating means, forms interpolated data to be applied to the servo amplifiers as objects to be controlled, transmits the interpolated data to the servo amplifiers and the remote I/O units in synchronism with the request signal recurring at given periods, and synchronizes the request signals generated by the NC boards as the slave devices, the servo amplifiers, which are controlled by the NC boards as the slave devices, are simultaneously controlled in an interpolating manner, and changes the number of calculations which are for forming the interpolated data, to thereby change a rate of transmitting the interpolated data to the servo amplifiers.

According to an additional aspect of the invention, there is provided a method of controlling a numerical control system using a personal computer, which has a personal computer including clock signal generating means and a personal computer (PC) extension bus for input/output extension, and a plural number of NC boards, connected to the PC extension bus, for controlling one of the servo amplifier system or the remote I/O unit system, wherein each of the NC boards controls the servo amplifiers or the remote I/O units being controlled by the NC board itself in accordance with an abnormal signal generated by the servo amplifiers or the remote I/O units controlled by the NC board itself or an abnormal signal generated by the NC board itself, and outputs the abnormal signal to the PC extension bus, the remaining NC board controls the servo amplifiers or the remote I/O units being controlled by the remaining NC board itself, in accordance with the abnormal signal received through the PC extension bus.

In the method of controlling the numerical control system, each of the NC boards may select the outputting of the abnormal signal to the PC extension bus.

According to a further aspect of the present invention, there is provided a method of controlling a numerical control system using a personal computer, which has a personal computer including clock signal generating means and a personal computer (PC) extension bus for input/output extension, and a plural number of NC boards, connected to the PC extension bus, for controlling one of the servo amplifier system Or the remote I/O unit system, wherein each of the NC boards includes a watch dog driven by a control signal received through the PC extension bus from the personal computer, and controls the servo amplifiers or the remote I/O units being controlled by the NC board itself in accordance with an abnormal signal of the personal computer received from the watch dog.

In the method of controlling the numerical control system, each of the NC boards may select the controlling of the servo amplifiers or the remote I/O units being controlled by the NC board itself in accordance with the abnormal signal.

According to another aspect of the present invention, there is provided a method of controlling a numerical control system using a personal computer, which has a personal computer including clock signal generating means and a personal computer (PC) extension bus for input/output extension, and a plural number of NC boards, connected to the PC extension bus, for controlling one of the servo amplifier system or the remote I/O unit system, wherein the personal computer or one of the NC boards is used for a master device, and the remaining NC boards are used for slave devices, and the slave devices each store the abnormal signal into an abnormal signal storing means, and output the abnormal signal to the PC extension bus in accordance with a control signal received through the PC extension bus from the master device.

In the method of controlling the numerical control system, the personal computer specifies the location of an abnormality in the numerical control system, e.g., the NC boards, the servo amplifiers, or the remote I/O units.

According to yet another aspect of the present invention, there is provided a method of controlling a numerical control system using a personal computer, which has a personal computer including clock signal generating means and a personal computer (PC) extension bus for input/output extension, and a plural number of NC boards, connected to the PC extension bus, for controlling one of the servo amplifier system or the remote I/O unit system, wherein each of the NC boards may select such an operation that the NC board receives a control signal, which is produced when the power switch of the personal computer is turned on or is reset, through the PC extension bus, generates an abnormal signal by using the control signal received, and controls the servo amplifiers or the remote I/O units being controlled by the NC board itself in accordance with the abnormal signal.

BRIEF DESCRIPTION OF THE DRAWINGS

The above and other objects and features of the present invention will be more apparent from the following description taken in conjunction with the accompanying drawings.

FIG. 4 is a diagram showing a set of waveforms of pulse signals useful in explaining how the PLL circuit generates a synchronous pulse (PLS) signal from a fundamental clock pulse (CLK) signal generated by a personal computer, in the first embodiment;

FIG. 5 is a diagram showing a set of waveforms for explaining a relationship among a fundamental clock pulse (CLK) signal, an address (AD) signal, an interrupt (RESET or IRQ) signal, and a synchronous pulse signal (PLS and PLSOUT);

FIG. 6 is a vector diagram showing a relationship of the X and Y axial movements when those axes are interpolated in the first embodiment;

FIG. 7 is a diagram showing a set of waveforms of pulse signals useful in explaining a relationship among a synchronous (sync) pulse signal (PLSOUT), a request (RQ) signal, and a signal representative of transmission data as the result of the interpolation in the first embodiment;

FIG. 8 is a diagram showing an example of the structure of data transmitted from the personal computer to a plural number of NC boards in the first embodiment;

DETAILED DESCRIPTION OF THE PREFERRED EMBODIMENTS

Hereinafter, a description will be given in detail of embodiments of the present invention with reference to the accompanying drawings.

(First Embodiment)

An embodiment of the present invention will be described in which a plural number NC boards and/or a plural number of remote I/O units are synchronized in their operation by using a pulse signal generated by a fundamental pulse generator of a personal computer (PC) and an extension bus contained in the personal computer.

Figure 1:
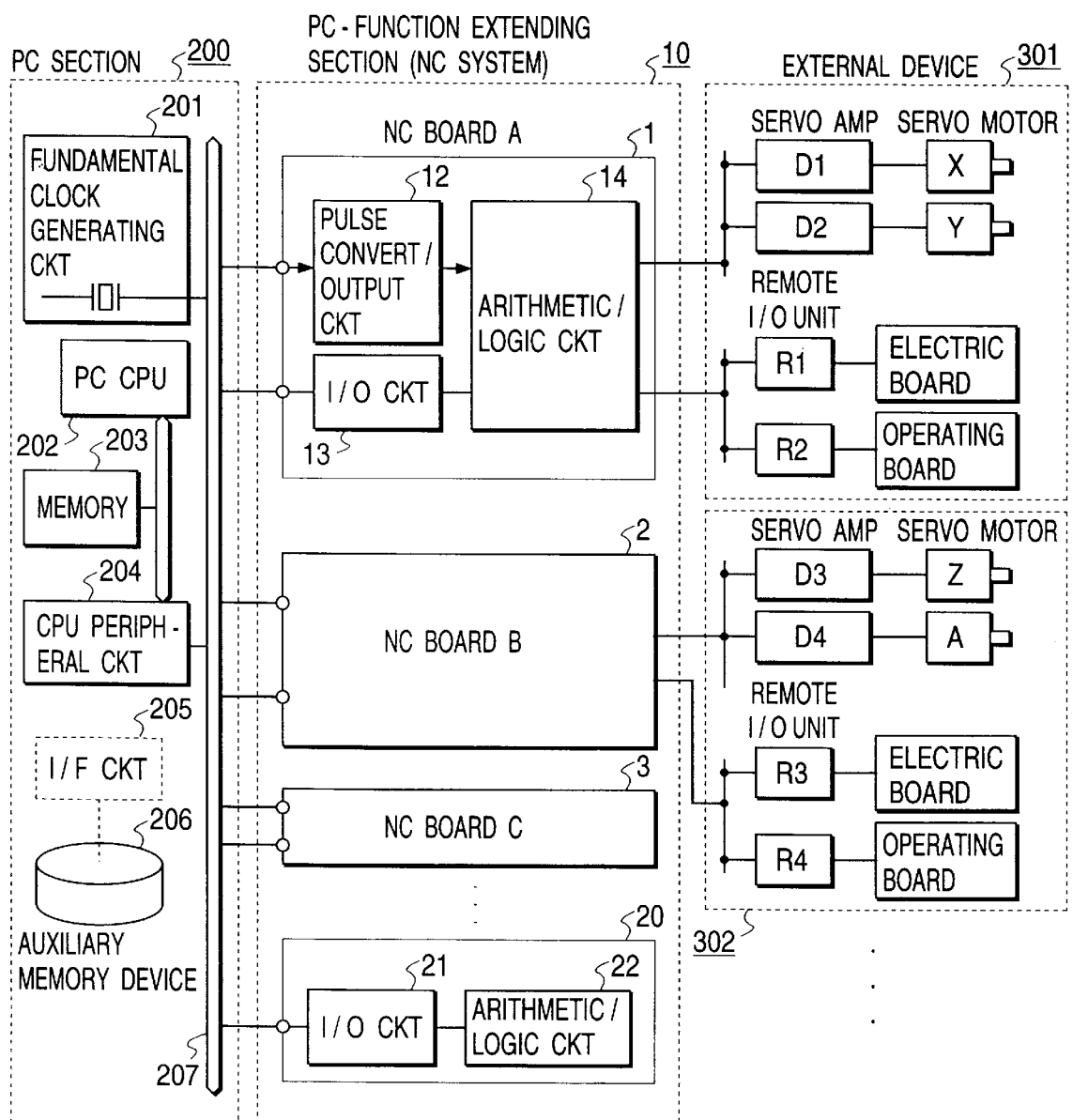
FIG. 1 is a block diagram showing an arrangement of a control system used in a numerical control system based on a personal computer into according to first and second embodiments of the present invention.
Figure 2:
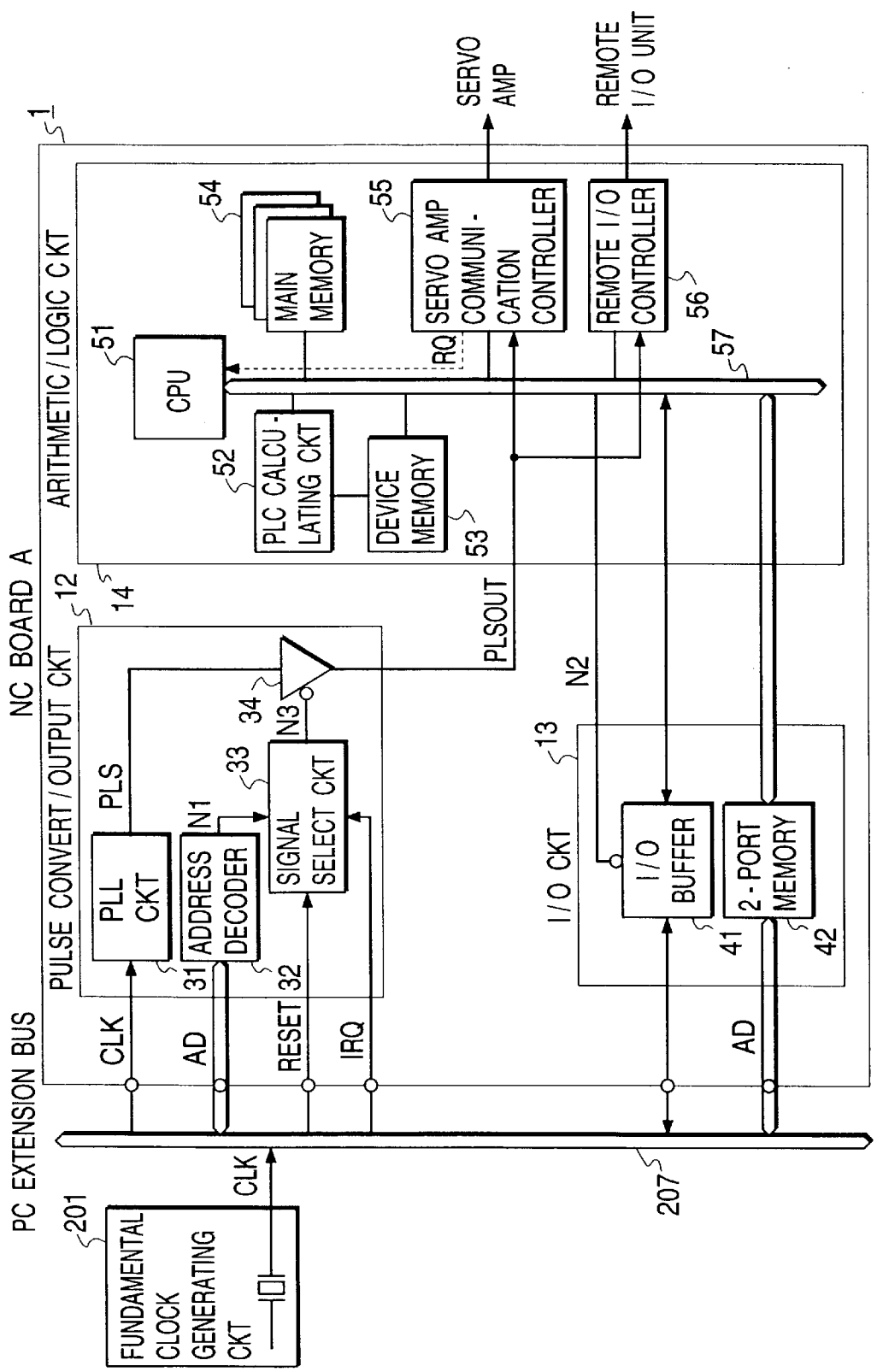
FIG. 2 is a block diagram showing the details of the inner construction of one of NC boards used in the first embodiment of the present invention.
Figure 3:
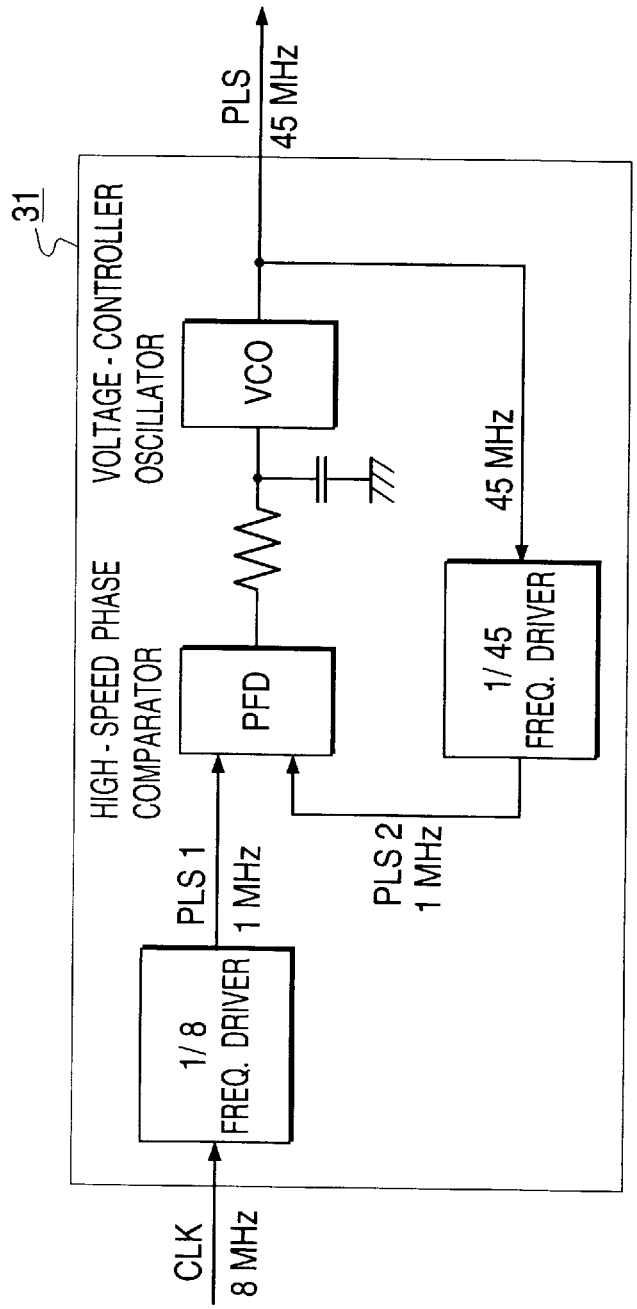
FIG. 3 is a block diagram showing an arrangement of a typical PPL (phase locked loop) circuit according to the first embodiment of the present invention.
Figure 9:
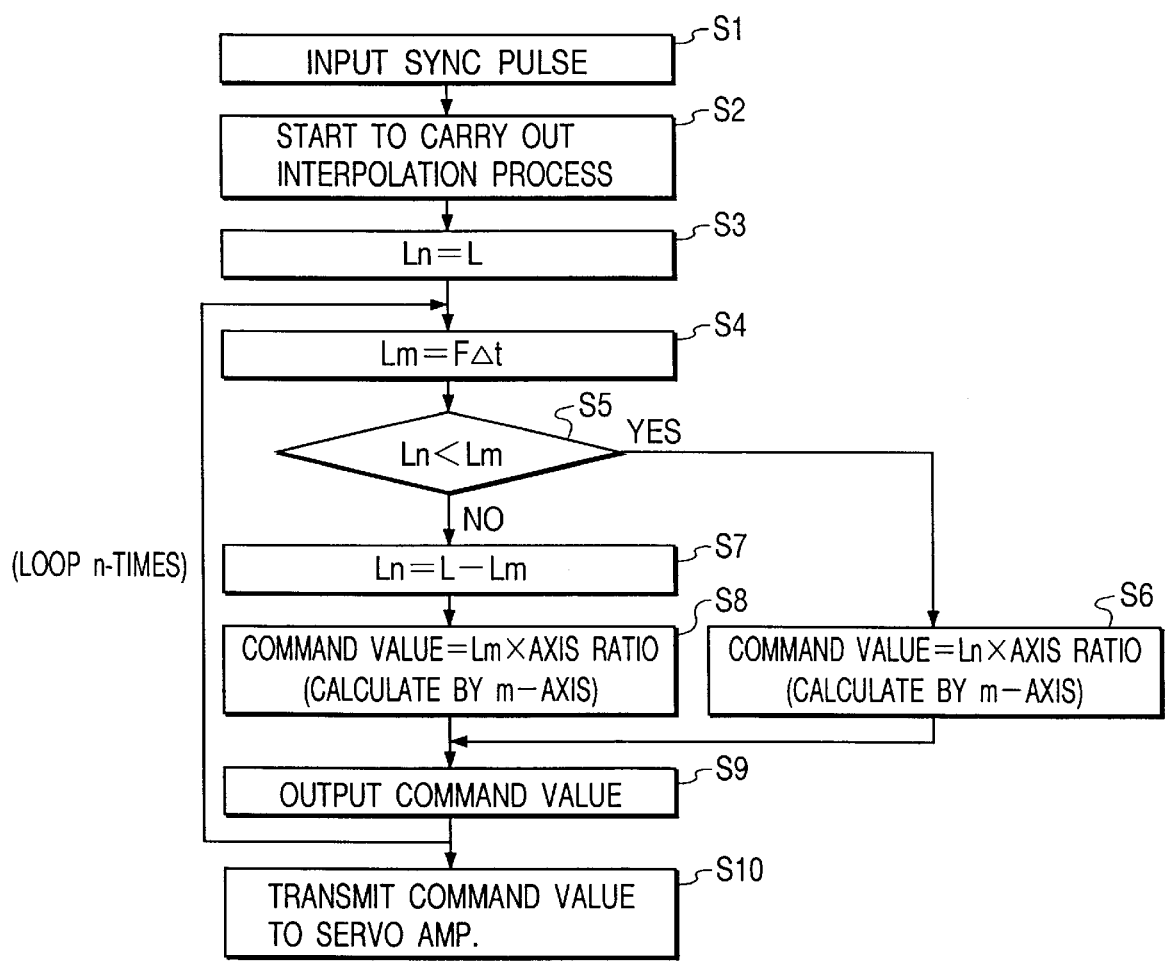
FIG. 9 is a flowchart showing a process in which the NC board outputs to a servo amplifier the interpolated data in the form of a command data signal to a servo amplifier in the first embodiment.
Figure 10A:
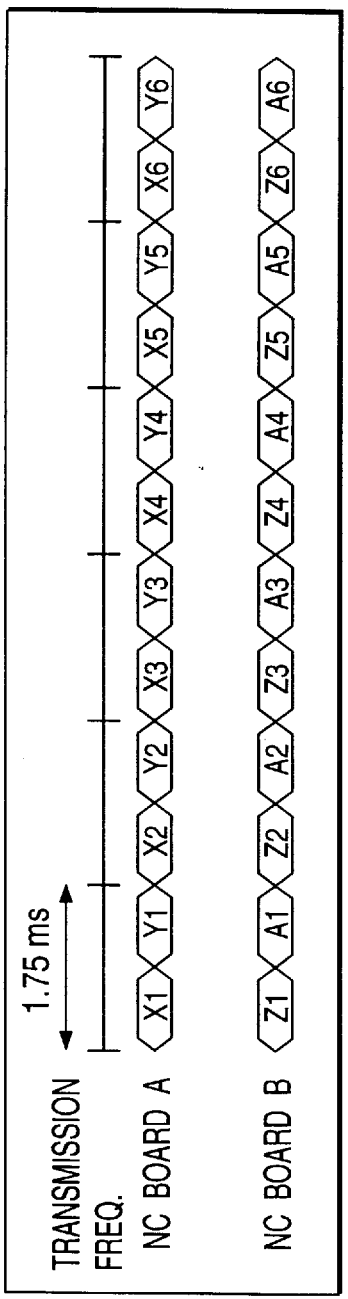
FIGS. 10A to 10C are time charts showing a relationship between the data interpolated by the NC board and transmission periods thereof in the first embodiment, respectively.
Figure 10B:
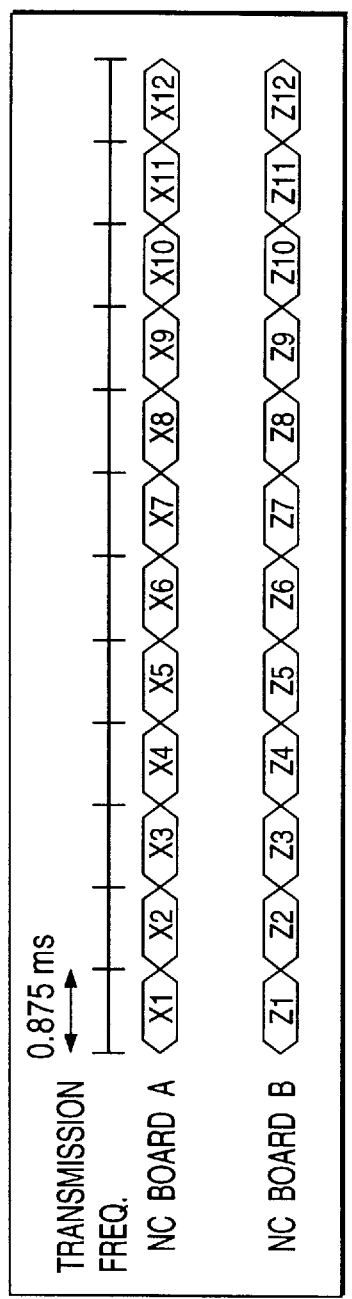
Figure 10C:
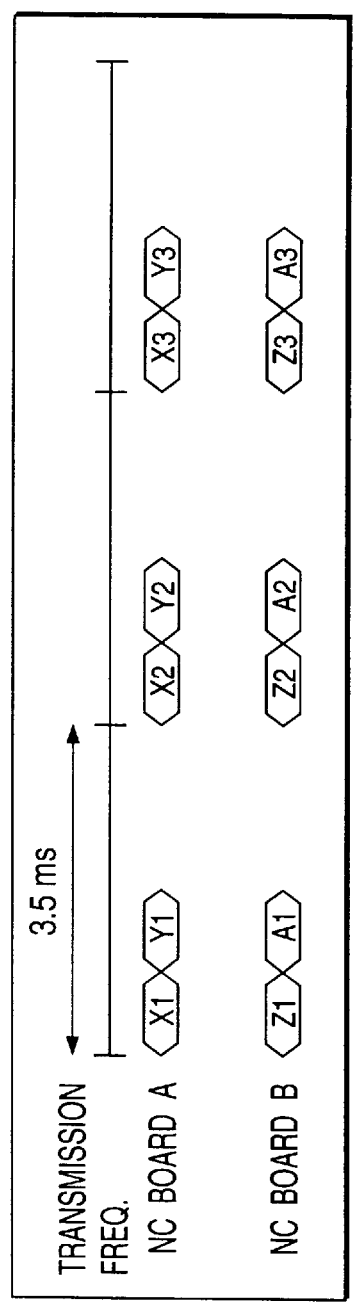
Figure 11:
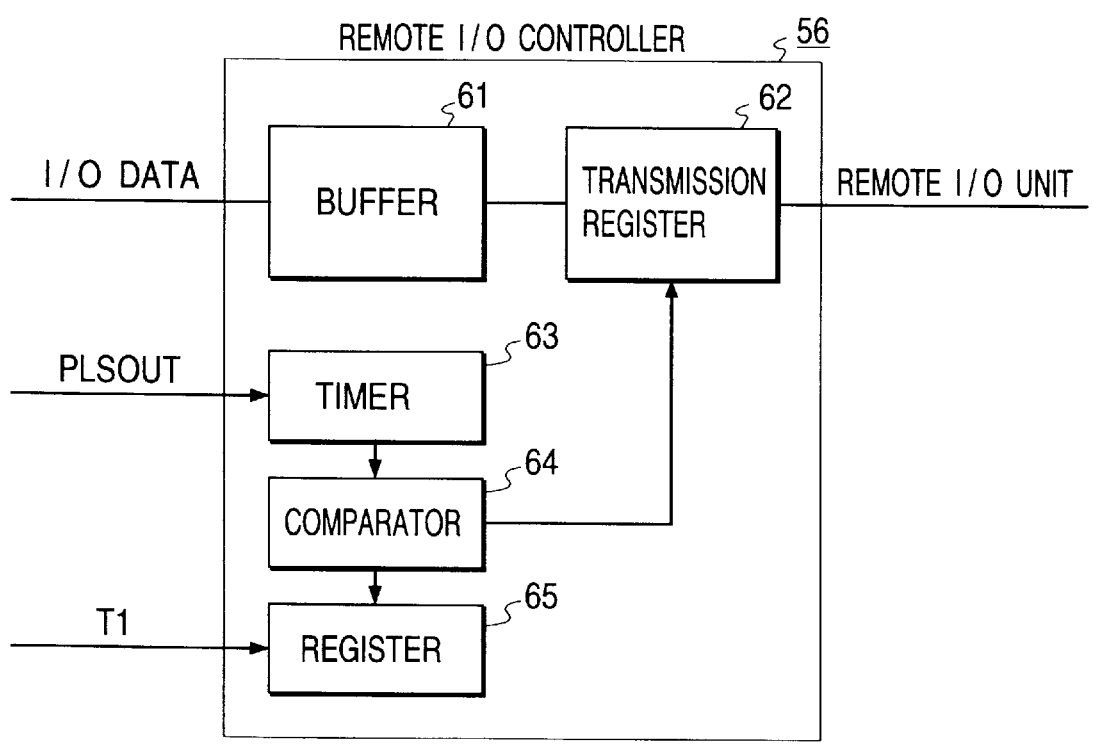
FIG. 11 is a block diagram showing an inner construction of a remote I/O controller 56 used in the first embodiment.
Figure 12:
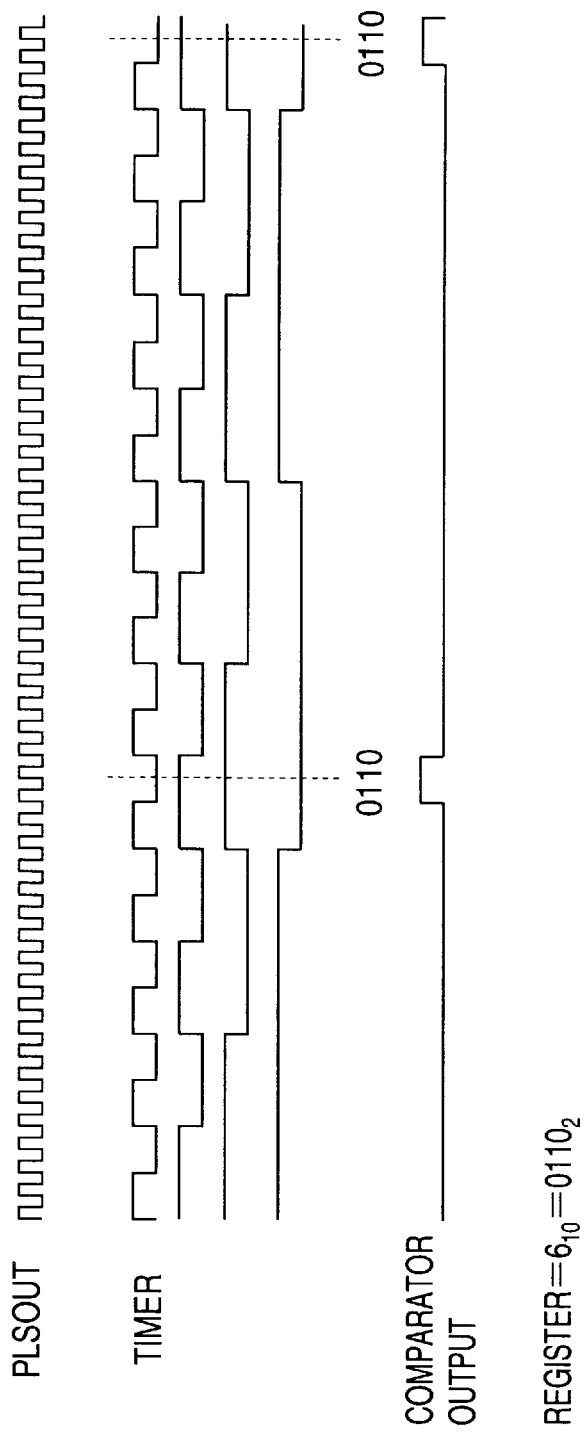
FIG. 12 is a diagram showing a set of waveforms of pulse signals useful in explaining the operation of the remote I/O controller 56 in the first embodiment.
Figure 13:
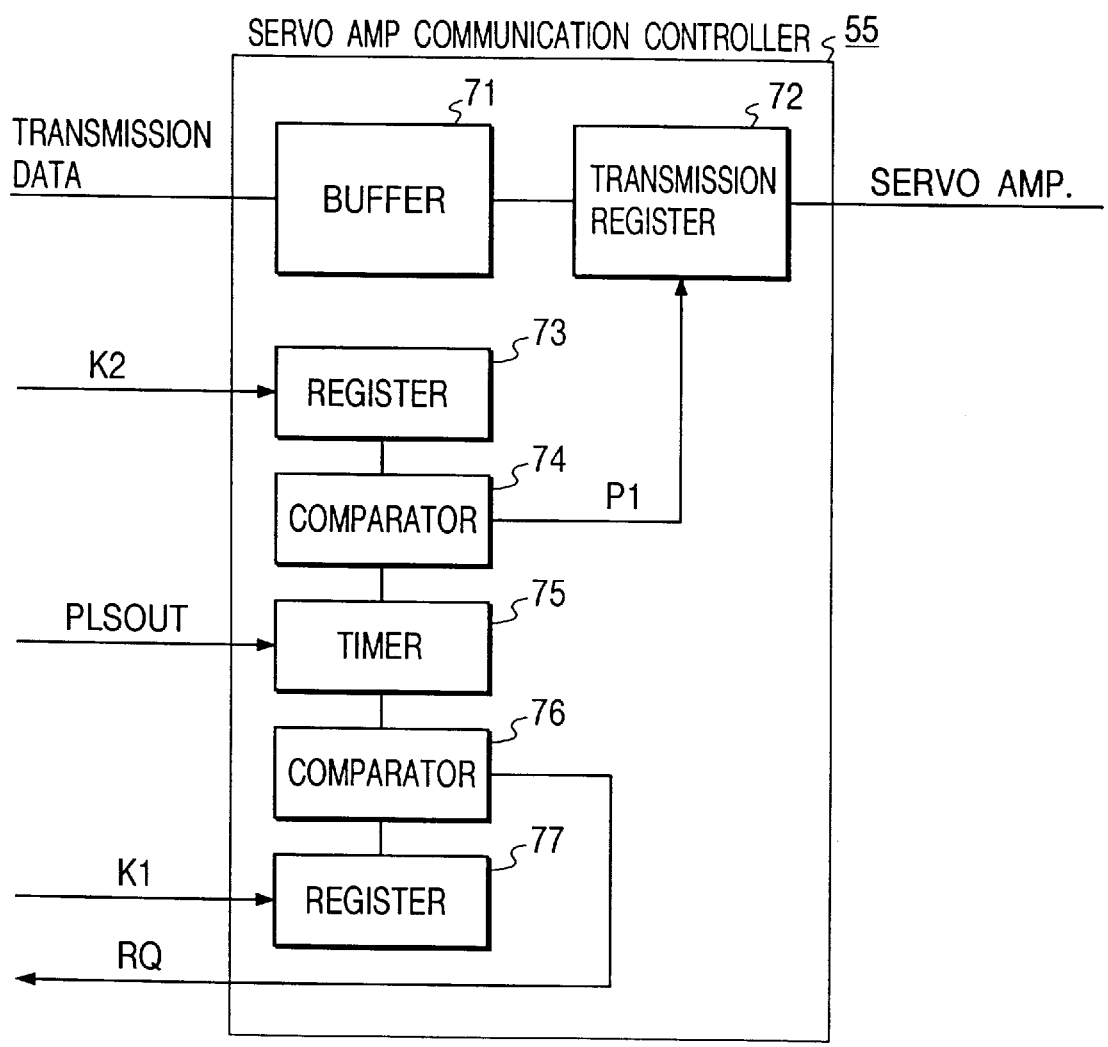
FIG. 13 is a block diagram showing a construction of a servo-amplifier communication controller 55 used in the first embodiment.
Figure 14:
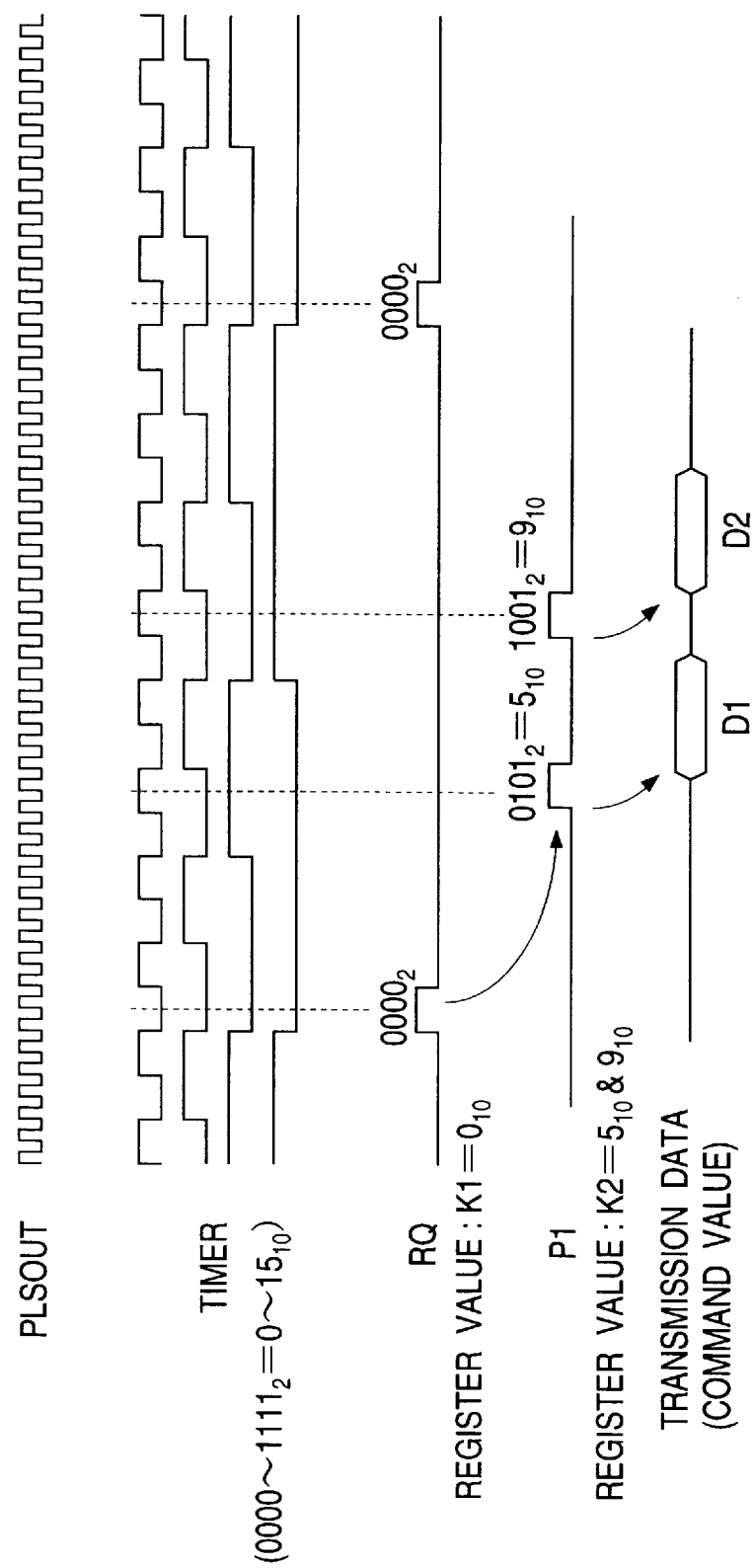
FIG. 14 is a diagram showing a set of waveforms of pulse signals useful in explaining the operation of the servo-amplifier communication controller 55 in the first embodiment.

FIG. 1 is a block diagram showing an arrangement of a control system used in a numerical control system based on a personal computer according to a first embodiment of the present invention. FIG. 2 is a block diagram showing an inner construction of one of NC boards used in the first embodiment of the present invention. FIG. 3 is a block diagram showing an arrangement of a typical PPL (phase locked loop) circuit in the first embodiment of the present invention. FIG. 4 is a diagram showing a set of waveforms of pulse signals useful in explaining how the PLL circuit generates a synchronous pulse (PLS) signal from a fundamental clock pulse (CLK) signal generated by a personal computer, in the first embodiment. FIG. 5 is a diagram showing a set of waveforms for explaining a relationship among a fundamental clock pulse (CLK) signal, an address (AD) signal, an interrupt (RESET or IRQ) signal, and a synchronous pulse signal (PLS and PLSOUT). FIG. 6 is a vector diagram showing a relationship of the X and Y axial movements when those axes are interpolated in the first embodiment. FIG. 7 is a diagram showing a set of waveforms of pulse signals useful in explaining a relationship among a synchronous pulse (PLSOUT), a request (RQ) signal, and a signal representative of transmission data as the result of the interpolation in the first embodiment. FIG. 8 is a diagram showing an example of the structure of data transmitted from the personal computer to a plural number of NC boards in the first embodiment. FIG. 9 is a flowchart showing a process in which the NC board outputs to a servo amplifier the interpolated data in the form of a command data signal to a servo amplifier in the first embodiment. FIGS. 10A to 10C are time charts showing a relationship between the data interpolated by the NC board and transmission periods thereof in the first embodiment, respectively. FIG. 11 is a block diagram showing an inner construction of a remote I/O controller 56 used in the first embodiment. FIG. 12 is a diagram showing a set of waveforms of pulse signals useful in explaining the operation of the remote I/O controller 56 in the first embodiment. FIG. 13 is a block diagram showing a construction of a servo-amplifier communication controller 55 used in the first embodiment. FIG. 14 is a diagram showing a set of waveforms of pulse signals useful in explaining the operation of the servo-amplifier communication controller 55 in the first embodiment.

Figure 19:
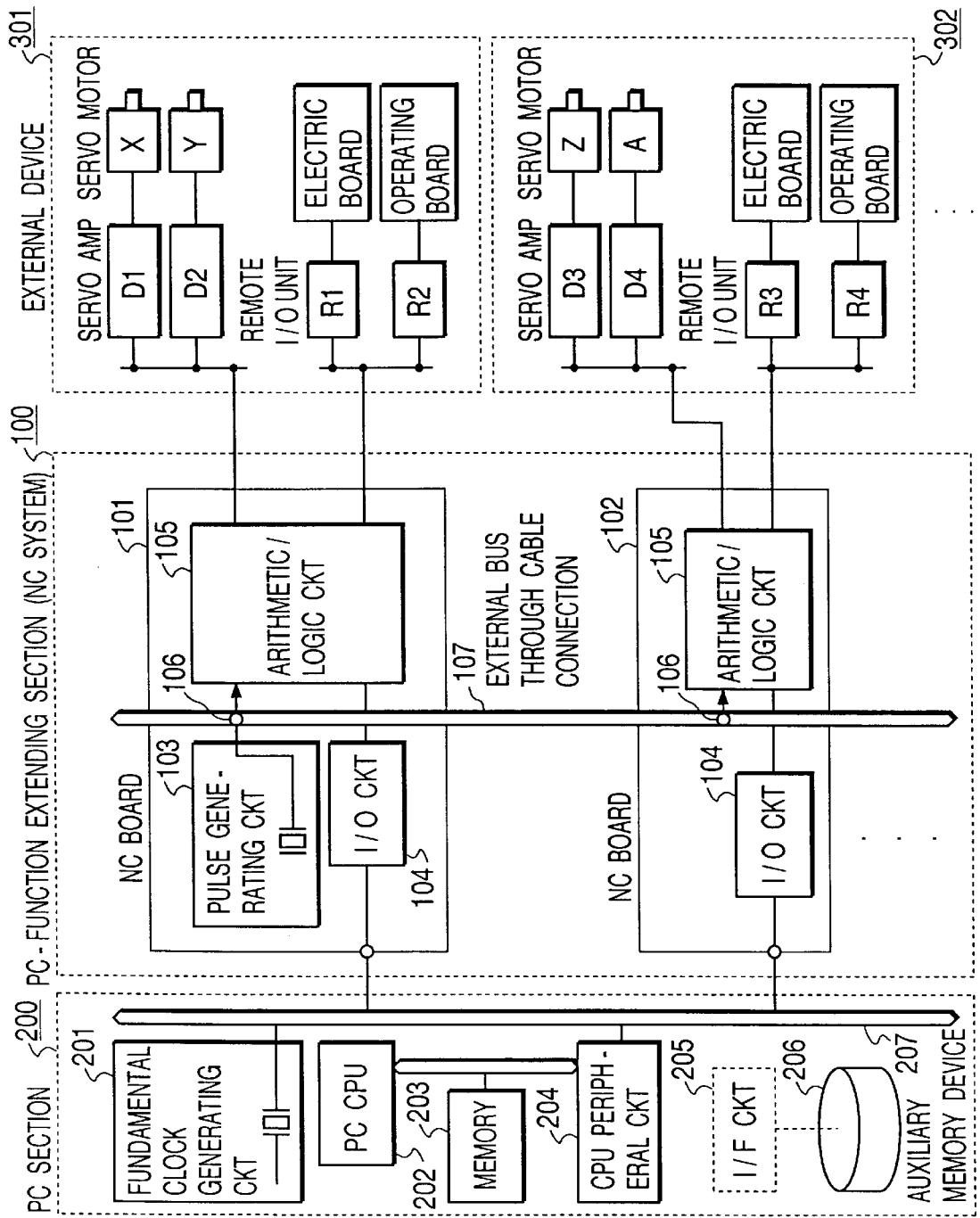
FIG. 19 is a block diagram showing the arrangement of a control system in a conventional PC-basis numerical control system.

In FIG. 1, reference numeral 200 designates a personal computer (PC) section, which is constructed with the same components as those of the conventional one already described in reference FIG. 19. Numeral 10 designates a personal computer function extension section with a numerical control function, which includes a plural number of numerical (NC) boards. Numeral 1 designates an NC board A; 2, an NC board B; 3, an NC board C. These NC boards are constructed with the same components arranged in the same fashion.

In the NC board A 1, for example, numeral 12 indicates a pulse convert/output circuit, 13, an input/output (I/O) circuit, and 14, an arithmetic/logic circuit. Numeral 20 designates a personal computer extension board, which includes an input output (I/O) circuit 21 and an arithmetic/logic circuit 22, and has the functions comparable with those of the PC section 200. The PC extension board 20 is provided for increasing the abilities of the personal computer. In each of the NC boards, the pulse convert/output circuit 12 and the I/O circuit 13 are connected to the PC extension bus 207. In the PC extension board 20, the I/O circuit 21 is connected to the PC extension bus 207, and transfers signals to and from the PC section 200.

Reference numerals 301 and 302 designate external devices. The remaining external devices are omitted for simplicity in the figure. Each of the external devices is constructed with the same components as of the external device used in the conventional PC-basis NC system shown in FIG. 19. The external devices 301 and 302 are respectively connected to NC boards A 1 and B 2, which serve as slave devices in the embodiment. The NC board A 1 controls the servo motors X and Y through servo amplifiers D1 and D2, and an electric board and an operation board through remote I/O units R1 and R2. The NC board B 1 controls the servo motors Z and A through servo amplifiers D3 and D4 and an electric board and an operation board through remote I/O units R3 and R4. In the embodiment, each of the NC board A 1 and NC board B 2 controls two shafts and two I/O devices. The number of the controlled objects is not limited to two, as a matter of course.

The NC board C 3, serving as a master device, analyzes a work program received from the PC section 200, and sends the results of the analysis to the NC boards as slave devices, viz., the NC board A 1 and the NC board B 2 in the embodiment. For this reason, the NC board C 3 is not connected to the external device. Any of the NC boards connected to the external devices may be used as the master device by killing the function to control the external device by so selecting the parameters in the NC boards. The PC extension board 20, like the NC board C 3, serves as the master device, and analyzes a work program received from the PC section 200, and sends the results of the analysis to the NC boards as slave device, viz., the NC board A 1 and the NC board B 2 in the embodiment.

FIG. 2 is a block diagram showing the details of the pulse convert/output circuit 12, the I/O circuit 13, and the arithmetic/logic circuit 14 in the NC board A 1.

In the pulse convert/output circuit 12, a PLL circuit 31 receives a fundamental clock signal CLK from the fundamental clock generating circuit 201 in the PC section 200, through the PC extension bus 207, and generates a sync pulse signal PLS of the frequency necessary for the synchronization on the basis the received fundamental clock signal CLK.

An address decoder 32 receives an address signal AD from the PC section 200, the NC board C 3 as a master board or the PC extension board 20, by way of the PC extension bus 207, and decodes the address signal AD and outputs the resultant in the form of a signal N1. A signal select circuit 33 receives the signal N1, which results from the decoding of the address signal AD, a signal RESET produced from the PC section 200 when its power switch is turned on or the PC section per se is reset, or an interrupt signal IRQ (e.g., an IRQ signal on an ISA bus) that is outputted from the NC board C 3 as a master device or the PC extension board 20 to the PC CPU 202 of the PC section 200, and produces a pulse-outputting permission signal N3. A gate 34 receives at the input terminal a sync pulse signal PLS and at the gate control terminal a pulse-outputting permission signal N3, and produces at the output terminal a sync signal PLSOUT that is used for synchronizing the NC boards as slave devices, or the NC board A 1 and the NC board B 2.

An operation of the PLL circuit 31 will be described with reference to FIGS. 3 and 4.

It is assumed that the fundamental clock signal CLK generated by the fundamental clock generating circuit 201 in the PC section 200 is 8 MHz. In the PLL circuit 31, the fundamental clock signal CLK is frequency divided into a sync pulse signal PLS1, by a ⅛ frequency divider. The sync pulse signal PLS1 is processed into a sync pulse signal PLS at 45 MHz, by a high speed phase comparator PFD and a voltage controlled oscillator VCO. The sync pulse signal PLS at 45 MHz is frequency divided into a sync pulse signal PLS2 at 1 MHz, by a ⅟45 frequency divider. The sync pulse signal PLS2 is inputted to the high speed phase comparator PFD.

As seen in FIG. 4, a phase difference (represented by a phase comparing waveform in the high speed phase comparator PFD) is present, in early stage, between the sync pulse signal PLS1 and the sync pulse signal PLS2, but it is removed through the feedback operation. As a result, the sync pulse signal PLS outputted from the PLL circuit is stable in its waveform.

The operation of the NC board in which a pulse-outputting permission signal N3 is generated using the signal from the master device, i.e., the PC section 200, the NC board C 3 or the PC extension board 20, and a sync signal PLSOUT is produced which is for synchronizing the NC boards as the slave device, i.e., the NC board A 1 and the NC board B 2, will be described with reference to FIG. 5.

First, when the PC section 200 serves as a master device, the PC section 200 operates in either of two modes for the synchronization. In a first mode, the PC section 200 synchronizes the sync signals PLSOUT outputted from the NC board A 1 and the NC board B 2 as slave devices by using the address signal AD. In a second mode, the PC section 200 synchronizes the sync signals PLSOUT by using the interrupt signal RESET.

In the first mode where the PC section synchronizes the sync signals PLSOUT outputted from the NC board A 1 and the NC board B 2 by using the address signal AD, the PC section 200 transfers an address signal AD through the PC extension bus 207 to the address decoders 32 in the NC board A 1 and the NC board B 2. In each of the NC board A 1 and the NC board B 2, a logic state of the signal N1 formed by decoding the address signal AD is changed from "0" to "1" since the presence of the address signal AD and the leading edge of a sync pulse PLS first appearing after the address signal AD is present, satisfy the AND condition. The "1" of the signal N1 and the trailing edge of a sync pulse PLS first appearing after the signal N1 is changed to "1" in logic state satisfy the AND condition, so that the pulse-outputting permission signal N3 is changed from "1" to "0" in logic state. The outputting of a sync signal PLSOUT is started at a time point of the leading edge of a sync pulse PLS first appearing after the pulse-outputting permission signal N3 is changed from "1" to "0". In this way, the sync signals PLSOUT outputted from the NC board A 1 and the NC board B 2 are synchronized with each other.

In the second mode where the interrupt signal RESET is used for synchronizing the sync signals PLSOUT, the pulse-outputting permission signal N3 of each of the NC board A 1 and the NC board B 2 is changed from "1" to "0" at a time point of the trailing edge of a sync pulse PLS first appearing after the interrupt signal RESET is changed from "1" to "0".

The outputting of the sync signal PLSOUT starts at a time point of the leading edge of a sync pulse PLS first appearing after the interrupt signal RESET is changed from "1" to "0".

Second, when the NC board C 3 or the PC extension board 20 serves as a master device, the NC board C 3 or the PC extension board 20 operates in either of two modes for the synchronization. In a first mode, it synchronizes the sync signals PLSOUT outputted from the NC board A 1 and the NC board B 2 as slave devices by using the address signal AD. In a second mode, it synchronizes the sync signals PLSOUT by using the interrupt signal IRQ.

In the first mode where the address signal AD is used for synchronizing the sync signals PLSOUT from the NC board A 1 and the NC board B 2, the NC board C 3 or the PC extension board 20 sends an address signal AD through the PC extension bus 207 to the address decoder 32 in each of the NC board A 1 and the NC board B 2. The subsequent operation in this mode is substantially the same as that when the PC section 200 synchronizes the sync signals PLSOUT from the NC board A 1 and the NC board B 2 by using the address signal AD.

In the second mode where the interrupt signal IRQ is used for synchronizing the sync signals PLSOUT from the NC board A 1 and the NC board B 2, the NC board C 3 or the PC extension board 20 sends an interrupt signal IRQ through the PC extension bus 207 to the PC CPU 202 in the PC section 200. The interrupt signal IRQ, like the interrupt signal RESET, changes a logic state of the pulse-outputting permission signal N3 from "1" to "0". The outputting of the sync signal PLSOUT starts at a time point of the leading edge of a sync pulse PLS first appearing after the signal N3 is changed from "1" to "0". In this way, the sync signals PLSOUT from the NC board A 1 and the NC board B 2 are synchronized.

In the I/O circuit 13 in FIG. 2, a 2-port memory 42 receives, through the PC extension bus 207, the analysis data of a work program from one of the PC section 200, the NC board C 3 and the PC extension board 20, which serve as a master device. An I/O buffer 41 transfers data to and from the PC extension bus 207. In the NC board C 3 or the PC extension board 20 as a master device, an input/output permission signal N2 is "0" (low) and the I/O buffer 41 transfers data to and from the PC extension bus 207. When the input/output permission signal N2 is "1", the I/O buffer 41 functions only to write the analysis data of the work program into the 2-port memory 42, and does not functions for the data transfer. In this case, the NC board of the I/O buffer 41 serves as a slave device.

In the arithmetic/logic circuit 14 in FIG. 2, reference numeral 51 designates a CPU. The CPU 51 carries out an interpolation calculating process for the servo amplifiers D1 and D2, viz., the servo motors X and Y, in the external device 301, on the basis of the analysis data of the work program that is stored in the external device 301. Numeral 55 designates a servo-amplifier communication controller 55. The controller sends a request signal RQ, which is synchronized with a sync signal PLSOUT, to the CPU 51, and sends the interpolated data to the servo amplifiers D1 and D2. At this time, the interpolated data is sent to the servo amplifiers in synchronism with the sync signal PLSOUT.

A main memory 54 stores a program for the master (referred to as a master program) when the NC board serves as a master device and a program for the slave (referred to as a slave program) when it serves as a slave device.

A PLC calculating circuit 52 calculates a sequence instruction to be transferred to the remote I/O unit in the external device 301, and transfers the data to the remote I/O controller 56.

A device memory 53 stores various types of devices that are used by the PLC arithmetic/logic circuit 52.

The servo-amplifier communication controller 55 in the arithmetic/logic circuit 14, which is mounted on the NC board A 1 serving as a slave device, will be described in detail with reference to FIGS. 13 and 14. In FIG. 13, reference numeral 71 designates a buffer; 72, a transmitting register; 73 and 77, registers; 74 and 76, comparators; 75, a timer. When one of the PC section 200, the NC board C 3 and the PC extension board 20, which serve as master devices, loads initial setting data K1 (=0) into the register 77, and initial setting data K2 (=5 and 9) into the register 73, the comparator 76 compares the value in the register 77 with a value of the timer 75 to which the sync signal PLSOUT is applied. When the value of the timer 75 is zero (0000 in binary number) (FIG. 14), the comparator 76 outputs a request signal RQ to the CPU 51 in the arithmetic/logic circuit 14.

The CPU 51 in the arithmetic/logic circuit 14 receives a request signal RQ, and carries out an interpolation calculating process, and transfers the result of the interpolation calculation to the buffer 71 in the servo-amplifier communication controller. The comparator 74 compares a value of the timer 75 that receives a sync signal PLSOUT with a value in the register 73. When the value of the timer 75 reaches 5 (0101 in binary number) and 9 (1001 in binary number), the comparator 74 transmits a transmission permission signal P1 to the transmitting register 72. In response to the signal P1, the transmitting register 72 allows the transmission data D1 and D2 to be transmitted from the buffer 71 to the servo amplifiers D1 and D2 in the external device. The storage of the calculation into the buffer 71 is completed before the value of the timer 75 is equal to K2, as a matter of course.

The remote I/O controller 56 in the arithmetic/logic circuit 14 on the NC board A 1 serving as a slave device will be described in detail with reference to FIGS. 11 and 12. In FIG. 11, reference numeral 61 designates a buffer; 62, a transmission register; 63, a timer; 64, a comparator; and 65, a register. The PC section 200, the NC board C 3 or the PC extension board 20, which serves as a master device, transmits transmission period setting data Tl, which is to be transmitted to the remote I/O unit in the external device, to the 2-port memory 42 in the I/O circuit 13. The transmission period setting data T1 is loaded into the register 65 in the remote I/O controller.

In the arithmetic/logic circuit 14, the PLC calculating circuit 52 calculates a sequence instruction, and transfers the resultant I/O data to the buffer 61 of the remote I/O controller. The operation to synchronize the sync signals PLSOUT, which are outputted from the NC boards as slave devices for transmission to the I/O units, follows. As shown in FIG. 12, when the transmission period setting data T1 stored in the comparator 64 is 6, for example, the comparator 64 compares a value stored in the register 65 with a value of the timer 63 which receives and frequency divides a sync signal PLSOUT. When those values are equal at 6 (0110 in binary number), the comparator transfers an output permission signal to the transmission register 62. At this timing, the I/O data that is stored in the buffer 61 is transmitted to the I/O units in the external device. In this way, the sync signals outputted from the NC boards serving as slave devices are synchronized with each other.

As described above, to synchronize the sync signals outputted from the NC boards, the PC-basis NC system of the present embodiment uses the interrupt signal RESET that is outputted at the time of the power on or the resetting of the PC section 200, or the interrupt signal IRQ outputted from the NC board C 3 or the PC extension board 20, which serves as a master device, or the address signal AD outputted from any of the PC section 200, the NC board C 3 and the PC extension board 20 which serve as master devices when the interrupt signals cannot be used since these are currently used for other controls. The PC-basis NC system, which uses such a signal for synchronizing the sync signals, can synchronize the sync signals PLSOUT outputted from all of the NC boards connected to the PC extension bus 207, which is also connected to the PC section 200, by merely connecting the NC boards to the PC extension bus 207.

A further description to follow is how the PC-basis NC system shown in FIGS. 1 and 2 operates to synchronize the interpolation calculating processes and the communication processes among the NC boards serving as slave devices by using the sync signals PLSOUT and the PC extension bus 207.

In the description to follow, the PC section 200 is used as a master device, while the NC board A 1 and the NC board B 2, as slave devices. The PC CPU 202 of the PC section 200 reads a work program from the auxiliary memory device 206 through the I/F (interface) circuit 205, and analyzes the work program. The PC CPU 202 serves as a bus master to the PC extension bus 207, and sends the data (referred to as analysis data), which is representative of the result of the analyzing of the work program, to the NC board A 1 and the NC board B 2 both serving as slave devices.

The NC board A 1 receives the analysis data of the work program through the PC extension bus 207, and stores it into the 2-port memory 42 in the I/O circuit 13. On the NC board A, the CPU 51 in the arithmetic/logic circuit 14 carries out an interpolation calculating process for the servo motors X and Y on the basis of the analysis data of the work program. The NC board A 1 sends the data (referred to as interpolated data) representative of the result of the interpolation calculation to the servo amplifiers D1 and D2, through the servo-amplifier communication controller 55. The NC board B 2 also sends the interpolated data to the servo amplifiers D1 and D2 in a similar way. The interpolated data is sent to the external device in synchronism with the sync signal PLSOUT outputted from the pulse convert/output circuit 12. Accordingly, the four shafts of the servo motors X, Y, Z and A are precisely controlled on the basis of the interpolated data.

The PC section 200, the NC board C 3 or the PC extension board 20, which serves as a master device, analyzes the work program according to a master program. In a case where the master device is the PC section 200, for example, the master program causes the PC CPU 202 to read a work program from the auxiliary memory device 206 through the I/F circuit 205, and to analyze the work program.

A process for analyzing the work program will be described with reference to FIG. 6 which shows an example of the interpolating process for the X and the Y axes.

In the process, the following data necessary for interpolating the X axis and the Y axis are extracted: the quantity L of the unit movement of one minute block, an X-axial moving distance ratio Lx/L of the quantity of movement of one block in the X axis to the unit movement quantity L, a Y-axial moving distance ratio Ly/L of the quantity of movement of one block in the Y axis to the unit movement quantity L, a moving distance $Fx\Delta t$ per minute unit time in the X-axial direction, and a moving distance $Fy\Delta t$ per minute unit time in the Y-axial direction. The data, L, Lx/L, Ly/L, $Fx\Delta t$ and $Fy\Delta t$, are sent to the NC board A 1 as a slave device through the PC extension bus 207. The data necessary for interpolating the Z axis and the A axis, L, Lz/L, La/L, $Fz\Delta t$ and $Fa\Delta t$, are sent to the NC board B 2 as a slave device through the PC extension bus 207.

In a case where the master device is the PC extension board 20 or the NC board C 3, the master device sends a bus master signal to the CPU peripheral circuit 204 in the PC section 200 in order to preferentially use the PC extension bus 207, and receives a bus master signal permission signal from the CPU peripheral circuit 204. A work program is read out of the auxiliary memory device 206 in the PC section 200, through the I/F circuit 205 in the PC section 200, the PC extension bus 207, and the I/O circuit 21 in the PC extension board 20 or the I/O circuit 13 in the NC board C 3. The readout work program is analyzed by the CPU in the arithmetic/logic circuit 22 on the PC extension board 20 or the arithmetic/logic circuit 14 on the NC board C 3. Thereafter, the master device acquires again the priority right to use the PC extension bus 207, and sends the data representative of the result of analyzing the work program, or the analysis data, to the NC board A 1 and the NC board B 2 as the slave devices, through the PC extension bus 207.

In the NC board A 1 as the slave device, the CPU 51 carries out the following process in accordance with a slave program that is stored in the main memory 54.

The slave device, or NC board A 1, receives the analysis data of the work program from the master device, and stores it into the 2-port memory 42 in the I/O circuit 13. Further, it receives a request signal RQ from the servo-amplifier communication controller 55 in the arithmetic/logic circuit 14, and carries out the interpolation process for the X axis and Y axis. The results of the interpolation calculation are sent to the servo amplifiers D1 and D2 for controlling the servo motors X and Y, through the servo-amplifier communication controller 55.

The NC board B 2 as the slave device, like the NC board A 1, carries out the interpolation process for the Z axis and A axis, and sends the results of the interpolation calculation to the servo amplifiers D3 and D4 for controlling the servo motors Z and A, through the servo-amplifier communication controller 55. At this time, the servo-amplifier communication controller 55 sends the request signal RQ to the CPU 51 in synchronism with the sync signal PLSOUT. Accordingly, the data are synchronously sent from the NC board A 1 and the NC board B 2 to the servo amplifiers D1 and D2, and D3 and D4.

A time chart showing a state where the data D1 and D2 transmitted to the NC board A 1 are synchronized with the data D3 and D4 to the NC board B 2 in response to the request signal RQ, in connection with the sync signal PLSOUT, is shown in FIG. 7.

Each of the NC boards is operable in a master mode in which the board functions as a master device or in a slave mode in which it functions as a slave device. Selection of the master mode or the slave mode is made in the PC section 200. Let us consider a case where the PC section 200 contains initial setting data as shown in FIG. 8.

It is assumed that of the addresses of the 2-port memory 42 of the I/O circuit 13 on the NC board A 1, the addresses fff00 and fff01 on the PC extension bus 207 side correspond to those ac001 and ac002 for the NC board A 1, respectively.

The PC CPU 202 of the PC section 200 writes information to set the NC board A 1 in a master mode or a slave mode in the least significant bit (LSB) of the address fff00 of the 2-port memory 42. For example, "1" is written into the LSB when the NC board is in a master mode, and "0" is written thereinto when the NC board is set in a slave mode.

When the writing operation of the mode setting information is completed, the PC section 200 sends a RESET signal to the NC board A 1. When driven by the RESET signal, the NC board A 1 receives the initial setting data by reading the LSB of the address ac001 of the 2-port memory 42. The structure of the initial setting data for the NC board A 1 is shown in FIG. 8. In the initial setting data for the NC board B 2, the address of the 2-port memory 42 on the PC extension bus 207 side may be fff02 and fff03.

The initial setting data, which contains the mode (master or slave) setting information, further contains data indicating the construction of the NC system, the number of slave NC boards and the board numbers, the number of the controlled shafts to be simultaneously interpolated and the shaft numbers of the shafts connected to the NC boards, the number of the remote I/O units to be synchronously controlled, and the like.

When the PC-basis NC system is driven, each of the NC boards operates in the following manner.

The NC board reads the initial setting data from the 2-port memory 42, and decides on the basis of the readout data whether or not the board per se operates in a master mode or a slave mode. When it operates in the slave mode, the NC board carries out the already-stated process for slave in accordance with the slave program that is stored in the main memory 54 in the arithmetic/logic circuit 14. The NC board transfers data to and from the PC extension bus 207, through the 2-port memory 42.

When it operates in the master mode, the NC board carries out the already-stated process for master in accordance with the master program that is stored in the main memory 54 in the arithmetic/logic circuit 14. The NC board transfers data to and from the PC extension bus 207, through the I/O buffer 41. For example, when the PC section 200 allows the NC board C 3 as a master device to have the right to use the PC extension bus 207, an input/output permission signal N2 to the I/O buffer 41 in the I/O circuit 13 is set to "0" (low), viz., made valid, and the NC board transfers data to and from the PC extension bus 207, through the I/O buffer 41.

A method of transmitting data to the servo amplifiers D1 and D2 of the slave board, for example, the NC board A 1 will be described in detail with reference to FIG. 9 showing a flowchart of an interpolation process.

As shown in FIG. 6, L indicates a quantity of the unit movement of one minute block; FΔt (=Lm), a quantity of movement per minute unit time; FxΔt and FyΔt, the X-component and the Y-component of the unit-time movement quantity FΔt; and Ln, the remnant distance of the unit movement quantity L, viz., the difference between the unit-time movement quantity Lm and the unit movement quantity L of one minute block.

In a step S1, the arithmetic/logic circuit 14 of the NC board A 1 receives a sync signal PLSOUT and in a step S2 the CPU 51 in the arithmetic/logic circuit 14 starts to carry out an interpolation process. In a step S3, the unit movement quantity L as an initial value is substituted into the remnant distance Ln. In a step S4, the CPU 51 calculates the unit-time movement quantity FΔt, and substitutes it into Lm. In a step S5, the remnant distance Ln is compared with the unit-time movement quantity Lm. If Ln<Lm, the unit-time movement quantity FΔt is in excess of the unit movement quantity L. Accordingly, in a step S6, the command values of the respective axes to the remnant distance Ln are calculated, and in a step S9 the calculated command values are outputted. In the step S5, if Ln is not smaller than Lm, the unit-time movement quantity FΔt is within the unit movement quantity L, and then in a step S7 the remnant distance Ln is updated by calculating Ln=L−Lm. In a step S8, the command values of the respective axes to the unit-time movement quantity Lm are calculated, and in the step S9 the calculated ones are outputted. The CPU 51 returns to the step S4, and repeats the feedback process four times. Then, the command values are transmitted to the servo amplifiers D1 and D2 in a step S10.

Assuming that the maximum number of the controlled shafts that can be simultaneously interpolated by all of the NC boards as the slave devices is k, and the number of the controlled shafts connected to the NC boards is m, the calculation for the controlled shafts is repeated m times, and the number n of the repeated operations of the feedback process may be set to any value within n≦k/m (the resultant fraction is discarded).

In a case where by using two NC boards that are capable of interpolation controlling four shafts at the maximum, four shafts are simultaneously controlled in an interpolating manner, k=4 and m=2. When n=2, a transmission cycle of transmitting the command values to the servo amplifiers is 1.75 ms, for example. When n =1, the transmission cycle is 3.5 ms.

In a case where by using two NC boards that are capable of interpolation controlling four shafts at the maximum, two shafts are simultaneously controlled in an interpolating manner, k=4 and m=1. When n=4, the transmission cycle is 0.875 ms. When n=2, the transmission cycle is 1.75 ms. When n=1, the transmission cycle is 3.5 ms.

Thus, by properly selecting the values of m and n, the transmission rate of transmitting the command values to the servo amplifiers may be changed flexibly. For example, if the number of the controlled shafts of each NC board is reduced, the transmission rate is increased, to thereby increase the working speed and the accuracy of work. To harmonize the operation speed of the NC system in question with that of another NC system, the transmission rate may be reduced in a manner that the n is decreased while the remaining k and m are left unchanged. Thus, the PC-basis NC system of the present invention has characteristics flexibly variable.

Examples of the relationships among the command values and the transmission cycles when the NC board A 1 and the NC board B 2 transmit the command values to the servo amplifiers, will be described with reference to FIGS. 10A to 10C. In the description, the NC board A 1 and the NC board B 2 send command value data to the pairs of the servo amplifiers D1 and D2, and D3 and D4, respectively. It is assumed that the interpolated data of the X axis transmitted from the NC board A 1 to the servo amplifier D1 are denoted as X1, X2, X3, . . . , and the interpolated data of the Y axis transmitted from the board to the servo amplifier D2 are Y1, Y2, Y3, . . . . Similarly, the interpolated data of the Z axis transmitted from the NC board B 2 to the servo amplifier D3 are denoted as Z1, Z2, Z3, . . . , and the interpolated data of the A axis transmitted from the board to the servo amplifier D4 are A1, A2, A3 . . . .

It is assumed that the time taken for transmitting the interpolated data one time is 0.875 ms. The data is transmitted in synchronism with the sync signal PLSOUT.

When the four axes, the X axis, the Y axis, the Z axis, and the A axis, are simultaneously interpolated, k=4 and m=2. If n=2, the NC board A 1 and the NC board B 2 each send the interpolated data to the respective servo amplifiers at the periods of 0.875 ms, as shown in FIG. 10A. Each servo amplifier receives the interpolated data at the periods of 1.75 ms.

When the two axes, the X axis and the Z axis, are simultaneously interpolated, k=4 and m=1. If n=4, the NC board A 1 and the NC board B 2 each send the interpolated data to the respective servo amplifiers at the periods of 0.875 ms, as shown in FIG. 10B. Each servo amplifier receives the interpolated data at the periods of 0.875 ms.

When the four axes, the X axis, the Y axis, the Z axis, and the A axis, are simultaneously interpolated, k=4 and m=2. If n=1, each of the NC board A 1 and the NC board B 2 sends the interpolated data of 0.875 ms long to the two servo amplifiers, and rests for 1.75 ms that is equal to the transmission time of two items of data, and sends again the interpolated data of 0.875 ms long, as shown in FIG. 10C. Each servo amplifier receives the interpolated data at the periods of 3.5 ms.

A method of synchronously controlling the remote I/O units will be described.

The PC section 200, or the NC board C 3 or the PC extension board 20, which serves as a master device, sends a transmission period setting data T1 to the register 65 of the remote I/O controller 56 of the arithmetic/logic circuit 14 of the NC board as a slave device, for example, the NC board A 1, by way of the 2-port memory 42 of the I/O circuit 13.

The NC board A 1 calculates a sequence instruction to the remote I/O units by the PLC calculating circuit 52 in the arithmetic/logic circuit 14, and transfers the resultant to the buffer 61 of the remote I/O controller 56. The transmission register 62, as described above, transmits the data, which is received from the buffer 61, to the remote I/O units R1 and R2 at the transmission periods T1, while being synchronized with that in another NC board serving as a slave device by using the sync signals PLSOUT. Also in the NC board B 2, the data that is received from the buffer 61 is transmitted to the remote I/O units R1 and R2 in accordance with the transmission period setting data T1, as in the NC board A 1.

(Second Embodiment)

A method of processing an alarm signal in an PC-basis NC system, particularly an alarm signal useful when synchronizing the operations of the NC boards, will be described with reference to FIGS. 15 to 18.

Figure 15:
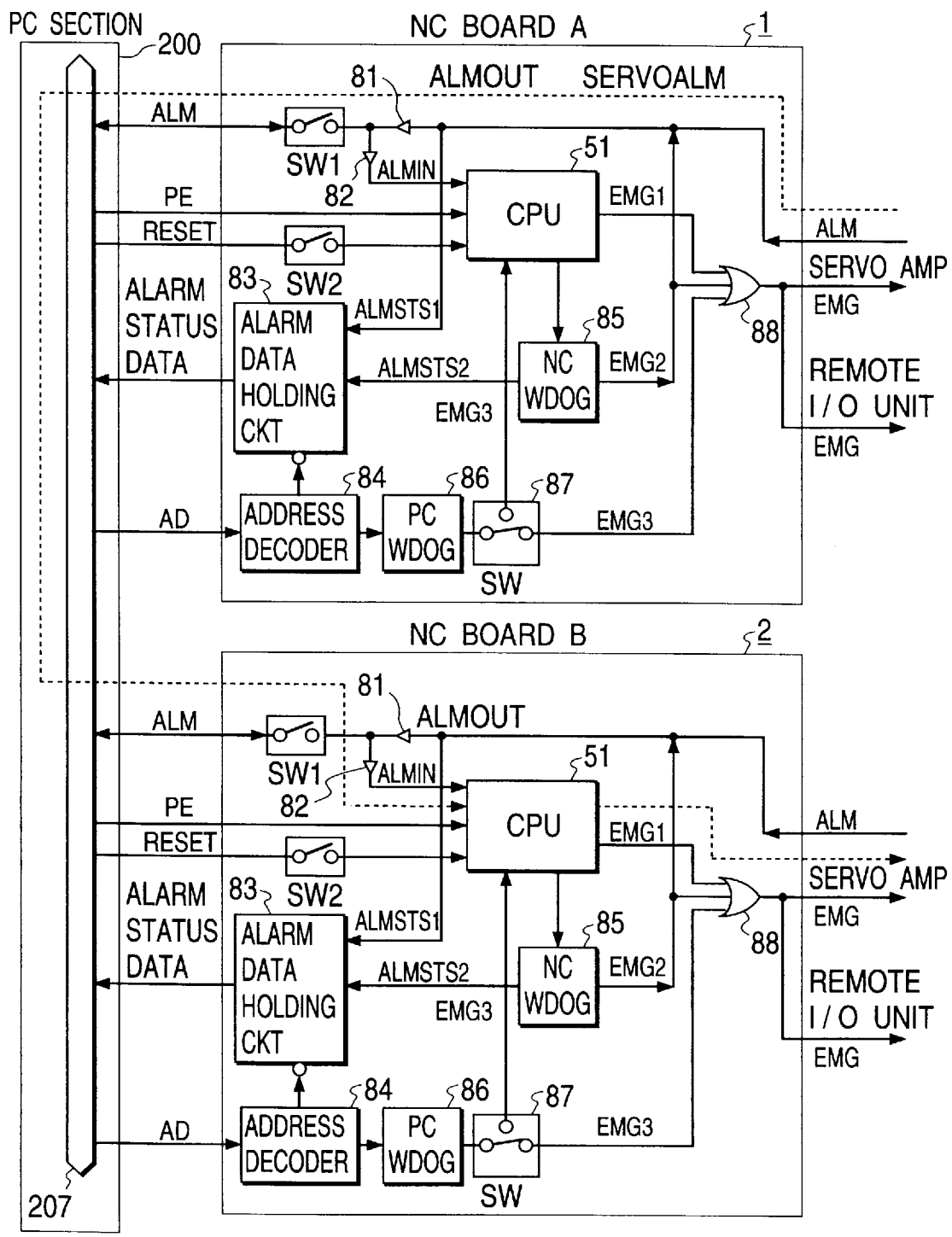
FIG. 15 is a block diagram showing an alarm system incorporated into the PC-basis NC system of FIG. 1 according to the second embodiment of the present invention.
Figure 16:
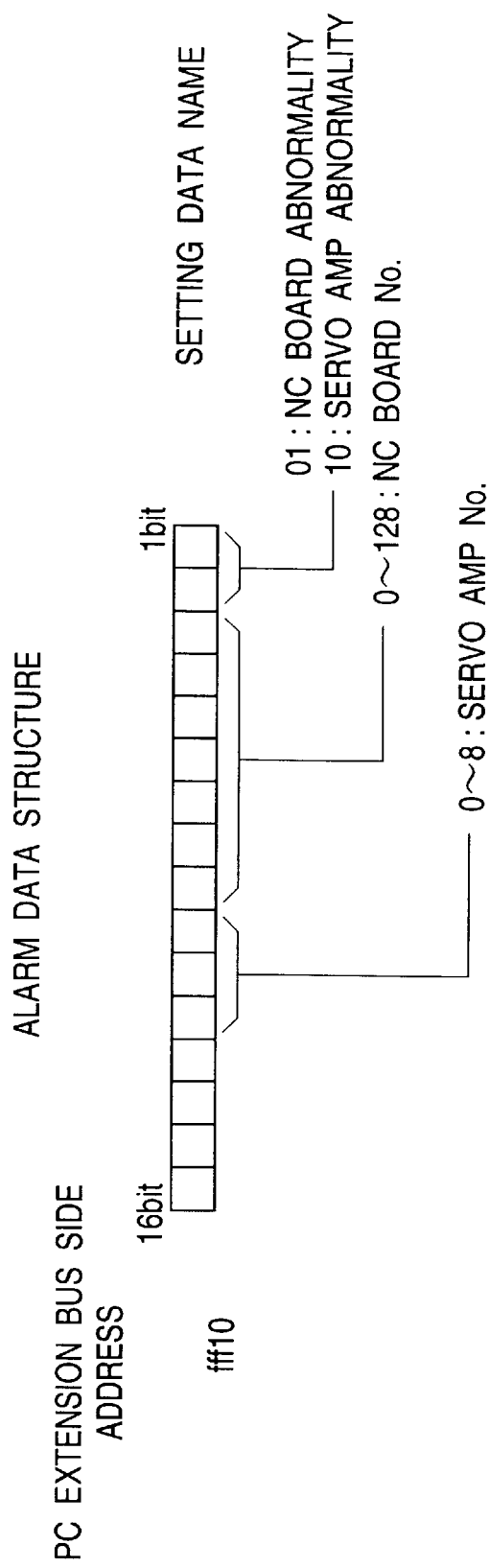
FIG. 16 is a diagram showing the structure of alarm data used in the second embodiment of the present invention.
Figure 17:
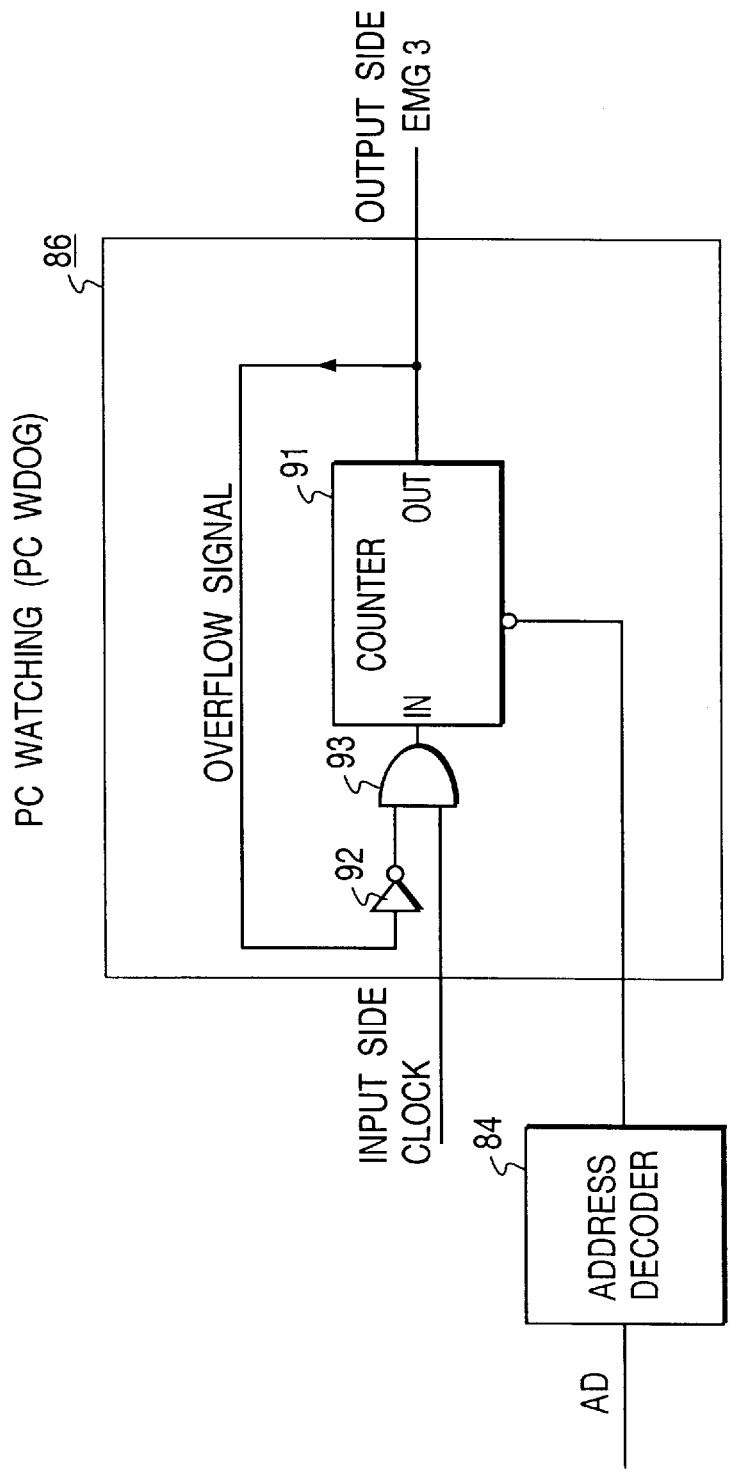
FIG. 17 is a block diagram showing a PC watch dog (PCWDOG) used in the second embodiment of the present invention.
Figure 18:
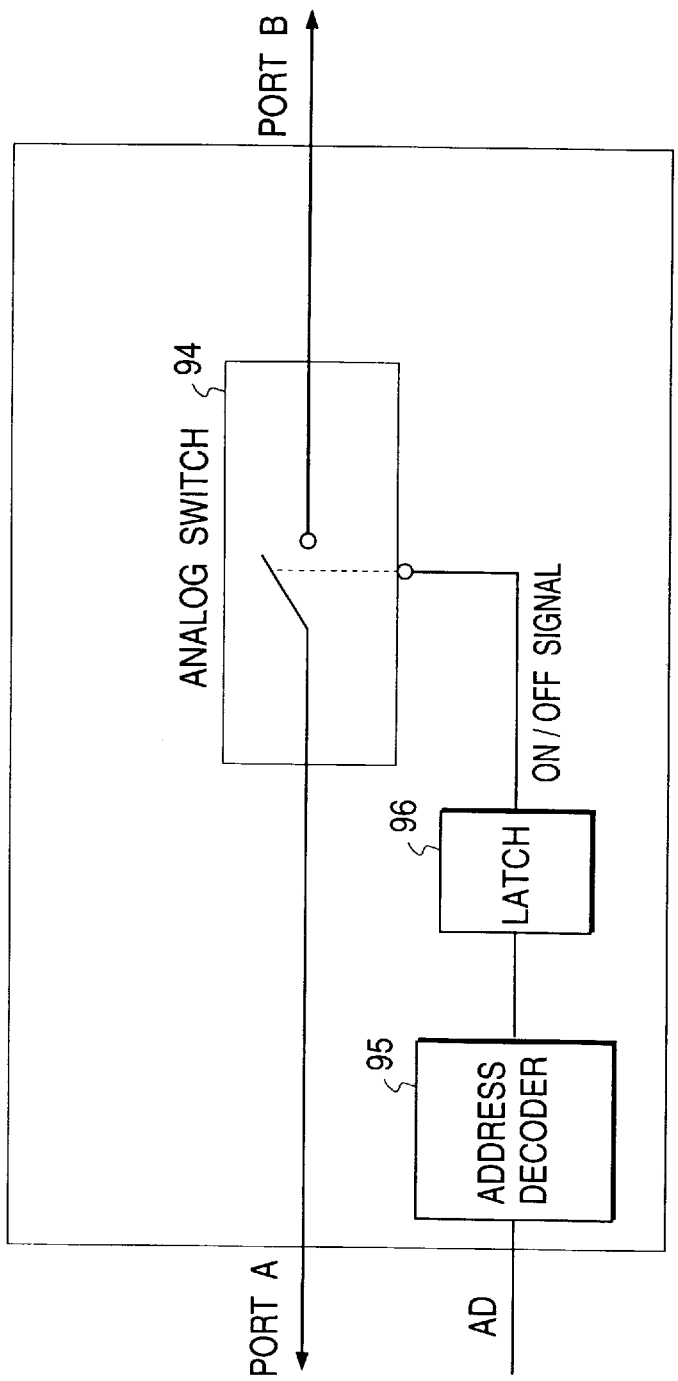
FIG. 18 is a block diagram showing a switch circuit used in the second embodiment of the present invention.

FIG. 15 is a block diagram showing an alarm system used in the PC-basis NC system shown in FIG. 1. FIG. 16 is a diagram showing an example of the structure of alarm data. FIG. 17 is a circuit diagram of a personal computer watch dog (PC WDOG). FIG. 18 is a block diagram showing an example of the construction of a switch circuit.

FIG. 15 is used for explaining the transfer of an alarm signal between the NC board A 1 and the NC board B 2 as slave devices, and the alarm signal transfer between the NC boards as the slave devices and the NC board or the PC section 200 as the master device. In the figure, the NC board A 1 has the same construction as of the NC board B 2. Like or equivalent portions in the figure are designated by like reference symbols in the figure referred to in the description of the first embodiment. In the figure, 81 designates an output buffer for an alarm signal; 82, an input buffer; 83, an alarm data storing circuit; 84, an address decoder for decoding an address signal AD received from the master device and producing the resultant; 85, an NC watch dog (NC WDOG) for detecting a failure of the CPU 51 in the NC board as the slave device; 86, an NC watch dog (NC WDOG) 86 for detecting a failure of the PC section 200 as the master device; 87, a switch SW 87 for setting up a path of an emergency signal EMG 3 from the NC watch dog 86 to the CPU 51 or a path of the same to the servo amplifiers or the remote I/O units in the external devices 301 and 302; and 88, an OR gate allowing the emergency signal EMG 3 to the servo amplifiers or the remote I/O units.

The operation of the NC watch dog 86 will be described with reference to FIG. 17.

Generally, the PC section 200 does not have the watch dog function. For this reason, it is necessary to detect a failure of the PC section 200 by providing the NC watch dog 86 in each of the NC boards connected to the PC extension bus 207. In the figure, reference numeral 91 designates a counter; 92, an invertor; and 93, an AND gate. In the input portion of the NC watch dog 86, a clock signal CLOCK, which recurs at fixed periods, is inputted to the AND gate 93. The period of the clock signal CLOCK is preferably shorter than that of the address signal AD outputted from the PC section 200.

The counter 91 counts up the received clock signal CLOCK till it overflows. When the PC section 200 normally operates, the PC section 200 periodically produces an address signal AD before the counter 91 overflows. The address signal AD is inputted to the address decoder 84 which in turn produces a decoded signal. The decoded signal resets the counter 91 before the counter 91 overflows. In this way, no overflow signal appears at the output terminal (OUT) of the counter 91.

When an abnormality occurs in the system or the like of the PC section 200 (but the power source of the personal computer is normal), the PC section 200 cannot periodically produce an address signal AD. In this case, the counter 91 overflows to produce an overflow signal. The overflow signal inhibits the clock signal CLOCK from being inputted to the counter 91, through the operation of the invertor 92 and the AND gate 93. As a result, the counter 91 stops its operation, and the NC watch dog 86 produces an emergency signal EMG 3 as a watch dog signal.

The details of the method of processing the alarm signal will be described with reference to FIG. 15 mainly. Let us consider a case where an alarm signal is issued from the NC board A 1 as the slave device.

If one of the servo motors or the servo amplifiers is faulty, the servo amplifier produces an ALM signal as an alarm signal. The ALM signal is outputted to the PC extension bus 207, through the output buffer 81 and a switch SW1 (it is closed). In the PC extension bus 207, the ALM signal uses an interrupt signal, for example, to the PC section 200, which is currently not used. The ALM signal is returned to the CPU 51 of its NC board, by way of the input buffer 82. The CPU 51 generates an emergency signal EMG 1 on the basis of the alarm signal, and sends it to the servo motors or the remote I/O units, by way of the OR gate 88. The emergency signal stops the servo motor or another external device.

The switch SW1 allows the ALM signal to go to the PC extension bus 207 or prohibits it from going to the same.

In a case where the synchronous control of the operations of the NC boards are not carried out, even if the servo amplifier being controlled by an NC board goes wrong, stops its operation, and an ALM signal is generated, another NC board normally operates irrespective of the abnormality.

Where the synchronous control of the operations of the NC boards are carried out, the servo amplifier or the servo motor being controlled by an NC board goes wrong and stops its operation, the servo motors being controlled by another NC board must also be stopped immediately. In this case, the ALM signal goes through the PC extension bus 207 and enters the NC board B 2. In the NC board B 2, the ALM signal reaches the CPU 51 through the switch SW1 and the input buffer 82. In response to the ALM signal, the CPU 51 generates an emergency signal EMG 1, and sends the emergency signal to the servo motors and the remote I/O units, through the OR gate 88. As a result, the servo motors and another external device, and the like are immediately stopped.

The ALM signal is also inputted as alarm status data (ALMSTS1) indicative of an alarm status to the alarm data storing circuit 83, and stored therein. The alarm status data stored may be read out of the alarm data storing circuit through the PC extension bus 207, from the PC section 200, the NC board C 3 or the PC extension board 20 as the master device.

For example, when the ALM signal is generated, the master device selects an address for alarm display, and outputs it as an address signal AD to the PC extension bus 207.

The address decoder 84 decodes the address signal AD to generate a signal representative of the result of the decoding, and outputs it as an output permission signal to the address decoder 84. And the address decoder 84 outputs alarm status data (ALMSTS1), which represents an alarm status corresponding to the ALM signal, to the PC extension bus 207.

The master device does not directly control the external device, such as servo motors. Hence, if it knows the ALM signal somewhat later, no problems arises.

An example of the structure of the alarm data is shown in FIG. 16. An address on the PC extension bus 207 side is fff10. The alarm data consists of 16 bits, and contains the amplifier numbers of the servo amplifiers, the board numbers of the NC boards, a code to indicate the abnormality of the NC board or the servo amplifier, and the like. Accordingly, the master device can specify the device generating the alarm signal.

When the NC board A 1 as the slave device is abnormal, the NC watch dog 85 in the NC board A 1 detects the abnormality of the CPU 51 contained in the board per se.

The operation of the NC watch dog 85 is substantially equal to that of the NC watch dog 86 that was described with reference to FIG. 17, except that it periodically receives a signal from the CPU 51 from the CPU 51, not the decoded signal from the address decoder 84.

When NC watch dog 85 detects an abnormality of the CPU 51, it produces an emergency signal EMG 2, and sends it through the OR gate 88 to the servo amplifiers and the remote I/O units. It immediately stops the servo motors or other external devices. At the same time, the emergency signal EMG 2 is outputted as an alarm signal to the PC extension bus 207, by way of the output buffer 81 and the switch SW1, as when the ALM signal is so done. Accordingly, it can inform another NC board B 2 of the abnormality of the NC board A 1. The emergency signal EMG 2 is inputted as alarm status data (ALMSTS2) indicative of an alarm status to the alarm data storing circuit 83, and stored therein.

The PC extension bus 207 is connected to another board, for example, the memory board or the video board. When the board is abnormal (not shown), the CPU 51 of the NC board A 1 as the slave device receives a PE signal (e.g., an IOCHK signal when the bus is an ISA bus) as a parity error signal or a bus error signal that is outputted from the memory board or the video board to the PC extension bus 207, and generates an emergency signal EMG 1 on the basis of the PE signal. The operation of the NC board A 1 after the emergency signal EMG 1 is generated is similar to that of it that is described above.

When the PC section 200 is abnormal, as shown in FIG. 17, the address decoder 84 decodes an address signal AD which the PC section 200 outputs to the PC extension bus 207, and the NC watch dog 86 generates an emergency signal EMG 3 using the decoded signal.

The emergency signal EMG 3 is transmitted to the servo amplifiers and the remote I/O units by way of the OR gate 88 or inputted to the CPU 51 where it is signal processed, by means of the switch SW 87. In the case where the emergency signal EMG 3 is inputted to the CPU 51, if the PC section 200 goes wrong, the CPU 51 can determine whether the servo amplifiers and the remote I/O units as the external devices is to be stopped or not. When the function to be exercised by the PC section 200 does not directly relate to the work process (e.g., the function to control the external device 301, for example), the emergency signal EMG 1 may be generated after a work process is completed. Thus, the alarm processing system may flexibly be constructed.

A RESET signal, which is produced when the power switch of the PC section 200 is turned on or the PC section 200 is reset, is outputted to the PC extension bus 207, and inputted to the CPU 51 of the NC board A 1 through the switch SW2.

The switch SW2 makes a selection of resetting the CPU 51 or not resetting the same by the RESET signal. When the switch SW2 is valid, the resetting of the PC section 200 resets the CPU 51 in the NC board A 1. Accordingly, the emergency signal EMG 1 is transmitted through the OR gate 88 to the servo motors and the remote I/O units, so that those are stopped in operation.

When the switch SW2 is not valid, only the PC section 200 is reset and the CPU 51 in the NC board A 1 is not reset. In this state, the NC board A 1 is allowed to continue the current work process. Thus, a flexible alarm processing system may be constructed.

Each of the switches SW1, SW2 and SW87 may be constructed with a dip switch, a data select circuit, or an analog switch. FIG. 18 shows an example of the construction of a switch circuit using an analog switch of a simple circuit construction. In the figure, reference numeral 94 designates an analog switch; 95, an address decoder; and 96, a latch.

An address signal AD for driving the switch, which is outputted from the master device or the slave device, is used for a signal for directing the drive of the switch. The address signal AD is decoded by the address decoder 95, and the decoded signal is applied as an on/off signal to the analog switch 94 by way of the latch 96. When the analog switch 94 is in an on state, the board A and the board B are interconnected.

Where the data selector circuit or the analog switch is used for the switch circuit, it may be operated for switching by a software. Therefore, such a flexible signal processing system that the switch is operated for switching while the NC boards execute a work process, may be constructed.

Since the present invention is constructed as described above, the invention has the following useful effects.

According to the present invention, there is provided a numerical control system using a personal computer, which has a personal computer including clock signal generating means and a personal computer (PC) extension bus for input/output extension, and a plural number of NC boards, connected to the PC extension bus, for controlling one of the servo amplifier system or the remote I/O unit system, wherein one of the plural number of NC boards is used as a master device and the remaining NC boards are used as slave devices, each of the slave devices comprises: sync signal generating means for receiving a pulse signal from the clock signal generating means through the PC extension bus; sync signal gate means for controlling the timing of starting the outputting operation of a pulse signal from the sync signal generating means; pulse-outputting permission signal generating means for receiving a control signal from the personal computer through the PC extension bus 207, the pulse-outputting permission signal generating means generates a pulse output permission signal on the basis of a control signal that is simultaneously received from the master device through the PC extension bus, and the sync signal gate means starts the outputting of the pulse signal received from the sync signal generating means, in response to the control signal from the master device, whereby the plurality of slave devices are synchronized with one another in their operation.

With such an arrangement, a plural number of slave devices are synchronized in operation by using a clock signal received through the PC extension bus. There is no need of using the external wire connecting the plural number of the NC boards for the synchronization of the boards.

A pulse signal for sync control is formed by using the clock signal from the personal computer. Therefore, a high precision sync control is realized with a simple construction.

In the numerical control system, the control signal is an address signal or an interrupt signal. In other words, the control signal of the personal computer is used directly. Therefore, a reliable sync control is realized with a simple construction.

According to another aspect of the present invention, there is provided a method of controlling a numerical control system using a personal computer, which has a personal computer including clock signal generating means and a personal computer (PC) extension bus for input/output extension, and a plural number of NC boards, connected to the PC extension bus, for controlling one of the servo amplifier system or the remote I/O unit system, wherein one of the plural number of NC boards is used as a master device and the remaining NC boards are used as slave devices, the slave devices synchronize the pulse signals received through the PC extension bus from the clock signal generating means on the basis of control signals simultaneously received through the PC extension bus from the master device, whereby the plurality of slave devices are synchronized with one another in their operation.

With such an arrangement, a plural number of slave devices are synchronized in operation by using a clock signal received through the PC extension bus. There is no need of using the external wire connecting the plural number of the NC boards for the synchronization of the boards.

A pulse signal for sync control is formed by using the clock signal from the personal computer. Therefore, a high precision sync control is realized with a simple construction.

In the method of controlling the numerical control system, the control signal is an address signal or an interrupt signal. In other words, the control signal of the personal computer is used directly. Therefore, a reliable sync control is realized with a simple construction.

In the method of controlling the numerical control system, at the time of starting up, the personal computer outputs initial setting data to the plural number of NC boards through the PC extension bus, and places the NC boards to a master mode or a slave mode with the initial setting data. With this, the NC boards as the hardware may readily be placed to a master mode or a slave mode. A flexible system may be constructed.

In the method of controlling the numerical control system, the master device analyzes a work program and outputs the data resulting from the analysis of the work program to the slave device, through the PC extension bus, and the slave device processes the analysis data in a calculative manner and sends the resultant data to one of the servo amplifier system and the remote I/O unit system in synchronism with the remaining one of the slave devices. Therefore, of the calculation process necessary for the numerical control, the pre-process is carried out by the master device, and the interpolation process is carried out by the slave devices. This lessens the load to the PC extension bus. The master device that carries out the pre-process may be modified in accordance with the user, leading to improvement of the system flexibility.

In the method of controlling the numerical control system, when the personal computer serves as a master device, the personal computer analyzes a work program read out of a storage device contained in the personal computer per se, acquires the priority right to use the PC extension bus, and outputs the analysis data of the work program to the plural number of slave devices through the PC extension bus, when one of the NC boards is a master device, the master device acquires the priority right to use the PC extension bus from the personal computer, reads the work program from the storage device of the personal computer through the PC extension bus, analyzes the readout work program, and acquires again the priority right to use the PC extension bus from the personal computer, and sends the analysis data of the work program through the PC extension bus to the plural number of slave devices. The personal computer or the NC board acquires the priority right to use the PC extension bus, and serves as a master device. This implies that the personal computer or the NC board may be used depending on the processing capability of them. A flexible system may be constructed.

In the method of controlling the numerical control system, each of the NC boards as the slave devices generates a request signal recurring at predetermined periods by using a control command from the master device and a sync signal generated from the clock signal generating means, forms the data to be applied to the servo amplifiers and the remote I/O units as objects to be controlled, transmits the formed data to the servo amplifiers and the remote I/O units in synchronism with the request signal recurring at given periods, and synchronizes the request signals generated by the NC boards as the slave devices, whereby the servo amplifiers and the remote I/O units, which are controlled by the NC boards as the slave devices, are synchronously controlled. The NC boards as the slave devices send the data to the servo amplifiers or the remote I/O units being controlled by them themselves under control of the sync signal generated by using the control command and the clock signal that are received through the PC extension bus. Therefore, a reliable synchronization of the servo amplifiers or the remote I/O units being controlled by them themselves is realized.

In the method of controlling the numerical control system, each of the NC boards as the slave devices generates a request signal recurring at predetermined periods by using a control command from the master device and a sync signal generated from the clock signal generating means, forms interpolated data to be applied to the servo amplifiers as objects to be controlled, transmits the interpolated data to the servo amplifiers and the remote I/O units in synchronism with the request signal recurring at given periods, and synchronizes the request signals generated by the NC boards as the slave devices, the servo amplifiers, which are controlled by the NC boards as the slave devices, are simultaneously controlled in an interpolating manner, and changes the number of calculations which are for forming the interpolated data, to thereby change a rate of transmitting the interpolated data to the servo amplifiers. The NC boards as the slave devices send the data to the servo amplifiers or the remote I/O units being controlled by them themselves under control of the sync signal generated by using the control command and the clock signal that are received through the PC extension bus.

Further, the rate of transmitting the interpolated data is varied. Therefore, the data transmitting rate may be varied in accordance with the work accuracy and the work rate. A flexible system is realized.

In a method of controlling a numerical control system using a personal computer, each of the NC boards controls the servo amplifiers or the remote I/O units being controlled by the NC board itself in accordance with an abnormal signal generated by the servo amplifiers or the remote I/O units controlled by the NC board itself or an abnormal signal generated by the NC board itself, and outputs the abnormal signal to the PC extension bus, the remaining NC board controls the servo amplifiers or the remote I/O units being controlled by the remaining NC board itself, in accordance with the abnormal signal received through the PC extension bus.

Thus, the abnormal signal is simultaneously inputted to all of the NC boards through the PC extension bus. Accordingly, when an abnormality takes place in the system, the NC boards and the remote I/O units being controlled by all of the NC boards may be controlled concurrently, without any time lag.

In the method of controlling the numerical control system, each of the NC boards may select the outputting of the abnormal signal to the PC extension bus. This implies that it selects whether or not the abnormal signal is transmitted to all of the NC boards. The NC board, which is not influenced by the abnormality, is allowed to continue its control operation. A flexible system is realized.

In a method of controlling a numerical control system using a personal computer, each of the NC boards includes a watch dog driven by a control signal received through the PC extension bus from the personal computer, and controls the servo amplifiers or the remote I/O units being controlled by the NC board itself in accordance with an abnormal signal of the personal computer received from the watch dog. With this method, an operating status of the personal computer is checked through the PC extension bus. When the personal computer goes wrong, the servo amplifiers or the remote I/O units can quickly be controlled. A reliable system is constructed.

In the method of controlling the numerical control system, each of the NC boards may select the controlling of the servo amplifiers or the remote I/O units being controlled by the NC board itself in accordance with the abnormal signal. When the personal computer is abnormal, it quickly determines whether or not it controls the servo amplifiers or the remote I/O units. Accordingly, it can determine whether or not it controls the servo amplifiers or the remote I/O units. A flexible abnormal processing system may be constructed.

In a method of controlling a numerical control system using a personal computer, the personal computer or one of the NC boards is used for a master device, and the remaining NC boards are used for slave devices, and the slave devices each store the abnormal signal into an abnormal signal storing means, and output the abnormal signal to the PC extension bus in accordance with a control signal received through the PC extension bus from the master device. The master device can know whether or not an abnormal signal is generated, when it is required. A flexible abnormal supervising system may be constructed.

In the method of controlling the numerical control system, the personal computer specifies the location of an abnormality in the numerical control system, e.g., the NC boards, the servo amplifiers, or the remote I/O units.

A user can find the location of an abnormality. The resultant abnormal supervising system provides an easy maintenance.

In another method of controlling a numerical control system using a personal computer, each of the NC boards may select such an operation that the NC board receives a control signal, which is produced when the power switch of the personal computer is turned on or is reset, through the PC extension bus, generates an abnormal signal by using the control signal received, and controls the servo amplifiers or the remote I/O units being controlled by the NC board itself in accordance with the abnormal signal. For a discontinuous operation of the personal computer, selection as to whether or not it immediately controls the servo amplifiers or the remote I/O units is made. The resultant abnormal processing system is flexible.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A numerical control system, comprising:

a personal computer including a clock signal generating means and a personal computer (PC) extension bus for input/output extension, and a plural number of NC boards connected to the PC extension bus, each NC board controlling one of a servo amplifier system and a remote I/O unit system, wherein the personal computer or one of the plural number of NC boards is used as a master device and the remaining NC boards are used as slave devices;

each of the slave devices comprises:

sync signal generating means for receiving a clock pulse signal from the clock signal generating means through the PC extension bus;

sync signal gate means for controlling the timing of the starting of an outputting operation of a sync signal received from the sync signal generating means;

pulse-outputting permission signal generating means for receiving a first control signal from the personal computer through the PC extension bus, the pulse-outputting permission signal generating means generating a pulse output permission signal to permit the output of said sync signal on the basis of a second control signal which is received from the master device through the PC extension bus, and the sync signal gate means starts the outputting of the sync signal received from the sync signal generating means, in response to the second control signal from the master device being received simultaneously with the first control signal from the personal computer, whereby the plurality of slave devices are synchronized with one another in their operation.

2. A numerical control system according to claim 1, in which the control signal is an address signal or an interrupt signal.

3. A method of controlling a numerical control system using a personal computer including a clock signal generating means and a personal computer (PC) extension bus for input/output extension, and a plural number of NC boards connected to the PC extension bus, each NC board controlling one of a servo amplifier system or a remote I/O unit system, wherein the method comprises:

setting one of the plural number of NC boards or the personal computer to be used as a master device;

setting the remaining of the plural number of NC boards to be used as slave devices;

generating a sync signal within each of said slave devices based upon a clock signal received from the clock signal generating means through the PC extension bus; and synchronizing the sync signals of the slave devices on the basis of control signals simultaneously received through the PC extension bus from the master device, whereby the plurality of slave devices are synchronized with one another in their operation.

4. A method of controlling the numerical control system according to claim 3, in which the control signals are selected from a group consisting of an address signal and an interrupt signal.

5. A method of controlling the numerical control system according to claim 3, in which at a time of starting up, the personal computer outputs initial setting data to the plural number of NC boards through the PC extension bus, thereby placing the NC boards to a master mode or a slave mode with the initial setting data.

6. A method of controlling the numerical control system according to claim 3, in which the master device analyzes a work program and outputs data resulting from the analysis of the work program to the slave device through the PC extension bus; and each of the slave devices process the analysis data in a calculative manner and send resultant data to one of the servo amplifier system and the remote I/O unit system in synchronism with the other slave devices.

7. A method of controlling the numerical control system according to claim 6, in which when the personal computer serves as the master device, the personal computer analyzes a work program read out of a storage device contained in the personal computer, acquires a priority right to use the PC extension bus, and outputs analysis data of the work program to the plural number of slave devices through the PC extension bus.

8. A method of controlling the numerical control system according to claim 3, in which each of the NC boards used as slave devices generates a request signal recurring at a predetermined period by using a control command from the master device and the sync signal generated from the clock signal generating means, forms the data to be applied to the servo amplifiers and the remote I/O units as objects to be controlled, transmits the formed data to the servo amplifiers and the remote I/O units in synchronism with the request signal recurring at the predetermined period, and synchronizes the request signals generated by the NC boards used as slave devices, whereby the servo amplifiers and the remote I/O units, which are controlled by the NC boards used as slave devices, are synchronously controlled.

9. A method of controlling the numerical control a system according to claim 3, in which each of the NC boards used as slave devices generates a request signal recurring at a predetermined period by using a control command from the master device and the sync signal generated from the clock signal generating means, forms interpolated data to be applied to the servo amplifiers as objects to be controlled, transmits the interpolated data to the servo amplifiers and the remote I/O units in synchronism with the request signal recurring at given periods, synchronizes the request signals generated by the NC boards as the slave devices, and changes the number of calculations which are form the interpolated data to thereby change a rate of transmitting the interpolated data to the servo amplifiers, wherein the servo amplifiers, which are controlled by the NC boards as the slave devices, are simultaneously controlled in an interpolating manner.

10. A method of controlling a numerical control system according to claim 3, wherein each of the NC boards controls the servo amplifiers or the remote I/O units being controlled by each of the NC boards in accordance with an abnormal signal generated by the servo amplifiers or the remote I/O units or an abnormal signal generated by the NC board itself, and outputs the abnormal signal to the PC extension bus, wherein each of the remaining NC boards controls the servo amplifiers or the remote I/O units being controlled by each of the remaining NC boards in accordance with the abnormal signal received through the PC extension bus.

11. A method of controlling the numerical control system according to claim 10, in which each of the NC boards may select the outputting of the abnormal signal to the PC extension bus.

12. A method of controlling a numerical control system using a personal computer including a clock signal generating means and a personal computer (PC) extension bus for input/output extension, and a plural number of NC boards connected to the PC extension bus, each of which control one of a servo amplifier system or a remote I/O unit system, wherein the method comprises:

providing each of the plural number of NC boards with a watch dog driven by a control signal received through the PC extension bus from the personal computer; and each of the plural number of NC boards controlling the servo amplifier system or the remote I/O unit system in accordance with an abnormal control signal of the personal computer received by the watch dog.

13. A method of controlling the numerical control system according to claim 12, in which each of the NC boards may select the controlling of the servo amplifiers or the remote I/O units being controlled by each of the NC boards in accordance with the abnormal signal.

14. A method of controlling a numerical control system using a personal computer including a clock signal generating means and a personal computer (PC) extension bus for input/output extension, and a plural number of NC boards connected to the PC extension bus, each of the plural number of NC boards controlling one of a servo amplifier system or a remote I/O unit system, wherein the method comprises:

setting the personal computer or one of the NC boards to be used as a master device;

setting the remaining plural number of NC boards to be used as slave devices;

storing an abnormal signal received by each of the slave devices into an abnormal signal storing means; and outputting the abnormal signal to the PC extension bus in accordance with a control signal received through the PC extension bus from the master device.

15. A method of controlling the numerical control system according to claim 3, in which the personal computer specifies the location of an abnormality in the numerical control system which occurs either in the NC boards, the servo amplifiers, or the remote I/O units.

16. A method of controlling a numerical control system according to claim 3, wherein each of the NC boards may select such an operation that the NC board receives a control signal which is produced when a power switch of the personal computer is turned on or is reset through the PC extension bus, generates an abnormal signal by-using the control signal received, and controls the servo amplifiers or the remote I/O units being controlled by each of the NC boards in accordance with the abnormal signal.

17. A method of controlling a numerical control system according to claim 12, wherein each of the NC boards may select such an operation that the NC board receives a control signal which is produced when a power switch of the personal computer is turned on or is reset through the PC extension bus, generates an abnormal signal by using the control signal received, and controls the servo amplifiers or the remote I/O units being controlled by each of the NC boards in accordance with the abnormal signal.

18. A method of controlling the numerical control system according to claim 6, in which when one of the NC boards is the master device, the master device acquires a priority right to use the PC extension bus from the personal computer, reads the work program from the storage device of the personal computer through the PC extension bus, analyzes the read work program, reacquires the priority right to use the PC extension bus from the personal computer, and sends analysis data of the work program through the PC extension bus to the plural number of slave devices.

* * * * *